United States Patent
Koo et al.

(10) Patent No.: US 12,238,519 B2
(45) Date of Patent: *Feb. 25, 2025

(54) METHOD AND APPARATUS FOR MANAGING EVENT FOR SMART SECURE PLATFORM

(71) Applicant: Samsung Electronics Co., Ltd., Suwon-si (KR)

(72) Inventors: Jonghoe Koo, Suwon-si (KR); Kangjin Yoon, Suwon-si (KR); Duckey Lee, Suwon-si (KR); Hyewon Lee, Suwon-si (KR); Taehyung Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,402

(22) Filed: Dec. 21, 2023

(65) Prior Publication Data

US 2024/0129727 A1 Apr. 18, 2024

Related U.S. Application Data

(63) Continuation of application No. 17/221,332, filed on Apr. 2, 2021, now Pat. No. 11,856,398.

(30) Foreign Application Priority Data

Apr. 2, 2020 (KR) .................. 10-2020-0040578
Aug. 25, 2020 (KR) .................. 10-2020-0107377

(51) Int. Cl.
*H04L 67/51* (2022.01)
*H04L 67/55* (2022.01)
(Continued)

(52) U.S. Cl.
CPC ............ *H04W 12/06* (2013.01); *H04L 67/55* (2022.05); *H04W 4/50* (2018.02); *H04W 12/71* (2021.01)

(58) Field of Classification Search
CPC ....... H04W 12/06; H04W 4/50; H04W 12/71; H04W 4/60; H04W 12/08; H04L 67/55; H04L 67/51
See application file for complete search history.

(56) References Cited

U.S. PATENT DOCUMENTS 11,856,398 B2 * 12/2023 Koo ............... H04W 12/71
2013/0160134 A1 6/2013 Marcovecchio et al.
(Continued)

FOREIGN PATENT DOCUMENTS

CN 106899540 A 6/2017
CN 107873137 A 4/2018
(Continued)

OTHER PUBLICATIONS

International Search Report dated Jun. 21, 2021 in connection with International Patent Application No. PCT/KR2021/004122, 4 pages.
(Continued)

*Primary Examiner* — Joseph E Dean, Jr.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. The disclosure provides a method and an apparatus for efficient event management using a secure element and a bundle installed therein.

20 Claims, 15 Drawing Sheets

(51) Int. Cl.
*H04W 4/50* (2018.01)
*H04W 4/60* (2018.01)
*H04W 12/06* (2021.01)
*H04W 12/71* (2021.01)

(56) References Cited

U.S. PATENT DOCUMENTS

| | | |
|---|---|---|
| 2015/0049748 A1 | 2/2015 | Ostling |
| 2017/0064552 A1 | 3/2017 | Park et al. |
| 2017/0325084 A1 | 11/2017 | Larignon et al. |
| 2018/0097797 A1 | 4/2018 | Hoyer et al. |
| 2018/0123803 A1 | 5/2018 | Park et al. |
| 2019/0074983 A1 | 3/2019 | Yang et al. |
| 2020/0389785 A1 | 12/2020 | Lee et al. |
| 2021/0126801 A1 | 4/2021 | Nix |

FOREIGN PATENT DOCUMENTS

| | | |
|---|---|---|
| CN | 109802826 A | 5/2019 |
| KR | 10-2019-0062063 A | 6/2019 |
| WO | 2001011534 A1 | 2/2001 |
| WO | 2019095948 A1 | 5/2019 |
| WO | 2019107876 A1 | 6/2019 |
| WO | 2019161939 A1 | 8/2019 |

OTHER PUBLICATIONS

Supplementary European Search Report dated Jun. 30, 2023, in connection with European Patent Application No. 21780857.5, 8 pages.
"Smart Cards; Smart Secure Platform (SSP); Requirements Specification", ETSI TS 103 465 V15.0.0, May 2019, 52 pages.
The First Office Action dated Aug. 6, 2024, in connection with Chinese Application No. 202180025739.6, 20 pages.

\* cited by examiner

| | SPBM-DS Info (802) | Family ID (803) | Custodian ID (804) | SPB ID (805) | Event acquisition method (806) | other factor (807) |
|---|---|---|---|---|---|---|
| 811 — Configured in LBA or SPBL when terminal is manufactured | www.spbmDs-example1.com (822) | Telecom_ID (823) | GSMA_ID (824) | | Polling (826) | |
| | www.spbmDs-example2.com | Telecom_ID | china_ID | | Push | ... |
| | www.spbmDs-example3.com | Card_ID | | | Polling and push | |
| | www.spbmDs-example4.com | Digital key_ID | | | | |
| | www.spbmDs-example5.com | Company_ID | Samsung_ID | | | |
| 812 — Configured by service provider (SPB metadata) | www.spbmDs-example6.com (832) | | | BundleID_1 (835) | | |

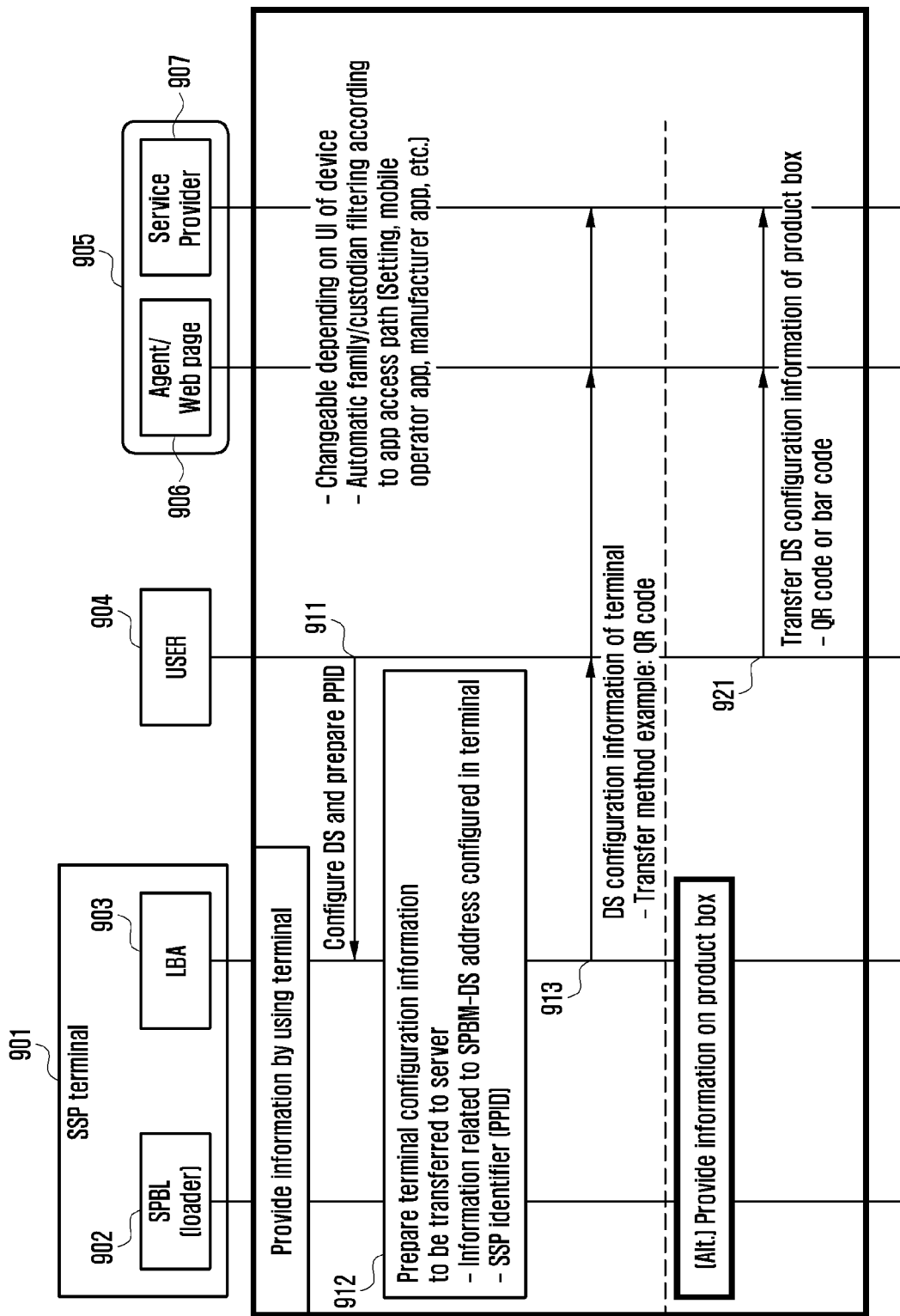

METHOD AND APPARATUS FOR MANAGING EVENT FOR SMART SECURE PLATFORM

CROSS-REFERENCE TO RELATED APPLICATIONS

This application is a continuation of application Ser. No. 17/221,332, filed Apr. 2, 2021, now U.S. Pat. No. 11,856,398, which is based on and claims priority under 35 U.S.C. § 119 to Korean Patent Application No. 10-2020-0040578 filed on Apr. 2, 2020 and Korean Patent Application No. 10-2020-0107377 filed on Aug. 25, 2020, in the Korean Intellectual Property Office, the disclosure of which is herein incorporated by reference in its entireties.

BACKGROUND

1. Field

The disclosure relates to a method and an apparatus for remotely controlling a bundle installed in a smart secure platform by using a discovery service which is provided by an event-managing server and a terminal including the smart secure platform; and installing a bundle in the smart secure platform; and in particular, relates to operations of a terminal and an event-managing server and a configuration related to a method in which the terminal acquires, from the event-managing server, predetermined information necessary for remotely controlling a bundle installed in a smart secure platform or installing a bundle in the smart secure platform.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth, have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, a discussion on the introduction of a secure element to further improve the security of a terminal is in progress, and in particular, a method for efficient event management using a secure element and a bundle installed therein is being studied.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide, in an embodiment, a method performed by a terminal in a wireless communication system, wherein the terminal includes a secure element (SE) and an assistant application associated with the SE, the method comprising: transmitting, to a server associated with a discovery service for the terminal, by the assistant application, a first message for discovering an event associated with the terminal, the first message including an identifier associated with the SE; receiving, from the server, a second message including information on whether the event is stored in the server in response to the first message; transmitting, to the server, by the assistant application, a third message for retrieving the event, in case that the event is stored in the server; and receiving, from the server, a fourth message including information on the event in response to the third message, in case that the terminal is authenticated by the server.

According to another embodiment of the disclosure, the assistant application is configured with a server address, wherein the server address is configured per a family identifier or a custodian identifier, and a primary platform identifier (PPID) of the terminal is displayed with the server address based on a user request.

Further according to another embodiment of the disclosure, the identifier is generated based on a primary platform identifier (PPID) of the terminal and a server address, and the identifier is used for discovering the event stored in the server.

According to another embodiment of the disclosure, the method further comprises transmitting, to the server, by the assistant application, a fifth message including a request for a push based event notification; receiving, from the server, a sixth message including an indication whether the server accepts the request in response to the fifth message; and receiving, from the server, a notification of an event registration, in case that the indication indicates that the server accepts the request and an event associated with the push based event notification is registered.

According to another embodiment of the disclosure, the SE includes a smart secure platform (SSP) or a universal integrated circuit card (UICC), the assistant application includes a local bundle assistant (LBA) or a local profile assistant (LPA), and the server includes a SSP service discovery (SSPDS) or a subscription manager-discovery server (SM-DS).

Another embodiment of the disclosure provides a method performed by a server associated with a discovery service for a terminal in a wireless communication system, wherein the terminal includes a secure element (SE) and an assistant application associated with the SE, the method comprising: receiving, from the terminal, a first message for discovering an event associated with the terminal, the first message including an identifier associated with the SE; transmitting, to the terminal, a second message including information on whether the event is stored in the server in response to the first message; receiving, from the terminal, a third message for retrieving the event, in case that the event is stored in the server; authenticating the terminal based on the first message and the third message; and transmitting, to the terminal, a fourth message including information on the event in response to the third message, in case that the terminal is authenticated by the server.

Another embodiment of the disclosure provides a terminal in a wireless communication system, wherein the terminal includes a secure element (SE) and an assistant application associated with the SE, the terminal comprising: a transceiver configured to transmit and receive a signal; and a controller coupled with the transceiver and configured to: transmit, to a server associated with a discovery service for the terminal, by the assistant application, a first message for discovering an event associated with the terminal, the first message including an identifier associated with the SE, receive, from the server, a second message including information on whether the event is stored in the server in response to the first message, transmit, to the server, by the assistant application, a third message for retrieving the event, in case that the event is stored in the server, and receive, from the server, a fourth message including information on the event in response to the third message, in case that the terminal is authenticated by the server.

Another embodiment of the disclosure provides a server associated with a discovery service for a terminal in a wireless communication system, wherein the terminal includes a secure element (SE) and an assistant application associated with the SE, the server comprising: a transceiver configured to transmit and receive a signal; and a controller coupled with the transceiver and configured to: receive, from the terminal, a first message for discovering an event associated with the terminal, the first message including an identifier associated with the SE; transmit, to the terminal, a second message including information on whether the event is stored in the server in response to the first message; receive, from the terminal, a third message for retrieving the event, in case that the event is stored in the server; authenticate the terminal based on the first message and the third message; and transmit, to the terminal, a fourth message including information on the event in response to the third message, in case that the terminal is authenticated by the server.

The technical subjects disclosed in the present disclosure may not be limited to the above mentioned technical subjects, and other technical subjects which are not mentioned may be clearly understood, through the following descriptions, by those skilled in the art to which the disclosure pertains.

According to embodiments of the disclosure, the SSP terminal can receive, from the event-managing server, information about whether there is an event without the intervention of the SSP. Due to the nonintervention of the SSP, a service using the SSP cannot be interrupted in the process in which the SSP terminal communicates with the event-managing server, and the processing load of the SSP can be minimized during communication between the SSP terminal and the event-managing server.

According to embodiments of the disclosure, in the temporary SSP terminal identifier generation method, the SSP terminal can generate a temporary SSP terminal identifier on the basis of a string obtained by combining a unique identifier of the SSP and information about the event-managing server to which the temporary SSP terminal identifier is to be transferred. A hash function in which inverse transformation is difficult can be used to generate the temporary SSP terminal identifier. It may be difficult to extract a unique identifier of the SSP through the inverse transformation of the temporary SSP terminal identifier generated as described above. Therefore, the temporary SSP terminal identifier may make it difficult to track the use of the unique identifier of the SSP, and thus enables services satisfying General Data Protection Regulation (GDPR) enacted in the EU.

Further, according to some embodiments, an event-managing server can securely identify an SSP through digital certificate-based mutual authentication with the SSP and then transfer, to the SSP, an event package regarding an operation to be performed by the SSP, thereby preventing the event package from being intercepted and leaked.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 8 illustrates an event discovery configuration in a terminal according to embodiments of the present disclosure;

FIG. 9 illustrates a process for transferring an event discovery configuration of a terminal to a service provider according to embodiments of the present disclosure;

DETAILED DESCRIPTION

Figure 1:
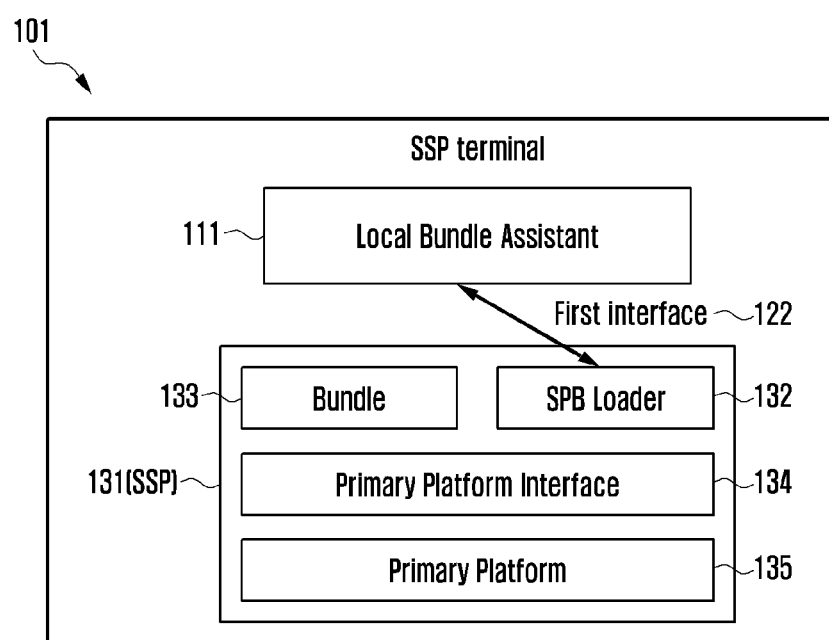
FIG. 1 illustrates an example of an interface between elements inside an SSP terminal according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Specific terms used in the following description are provided to help understanding of the disclosure, and the use of these specific terms may be changed to other forms without departing from the technical spirit of the disclosure.

1. Secure Platform (SE, eSE, UICC, eUICC, and SSP)

In the disclosure, a secure element (SE) refers to a security module formed as a single chip that stores security information (e.g., user identification information such as a mobile communication network access key and an ID/passport, credit card information, encryption key, etc.) and in which control modules (e.g., a network access control module such as a USIM, etc., an encryption module, a key generation module, etc.) using the stored security information can be loaded and operated. The SE can be used for a variety of electronic devices (e.g., smartphones, tablets, wearable devices, automobiles, IoT devices, etc.), and can provide security services (e.g., access to mobile communication networks, payment, user authentication, etc.) through the security information and the control modules. The SE may be used as a term commonly indicating a universal integrated circuit card (UICC), an embedded secure element (eSE), and a smart secure platform(SSP) in which a UICC and an eSE are integrated, and may be divided into a removable type and an embedded type, depending on a type in which the SE is connected or installed to an electronic device, and an integrated type in which the SE is integrated with a specific element or (system-on-chip (SoC)).

In the disclosure, an embedded secure element (eSE) is an embedded SE that is used while being embedded in an electronic device. An eSE may be manufactured so as to be normally dedicated to a terminal manufacturer at the request of the terminal manufacturer, and may be manufactured to include an operating system and a framework. The eSE may remotely download and install an applet-type service control module, and may be used for various security services such as an electronic wallet, ticketing, an electronic passport, and a digital key. In the disclosure, a single chip-type SE, which is attached an electronic device and is capable of remotely downloading and installing a service control module, is commonly referred to as an eSE.

In the disclosure, a universal integrated circuit card (UICC) is a smart card inserted into a mobile communication terminal or the like, and is also referred to as a UICC. The UICC may include an access control module for accessing a mobile operator network. Examples of access control modules include a universal subscriber identity module (USIM), a subscriber identity module (SIM), and IP multimedia service identity module (ISIM). A UICC including the USIM is also commonly referred to as a USIM card. Similarly, a UICC including the SIM module is also commonly referred to as a SIM card. A SIM module may be loaded when the UICC is manufactured, or a SIM module for a mobile communication service, which a user desires to use, may be downloaded to the UICC at a user's desired time. The UICC may also download and install multiple SIM modules, and may select and use at least one SIM module from among the multiple SIM modules. The UICC may be used while being fixed to a terminal or may be used while being attached/detached from the terminal according to a chip form factor.

A UICC embedded and used in a terminal in the form of a chip is referred to as an embedded UICC (eUICC), and particularly, a UICC embedded in system-on-chip (SoC) including a communication processor of a terminal, an application processor thereof, or a single integrated processor structure in which the two types of processors are integrated is also referred to as an integrated UICC (iUICC). Typically, the eUICC and iUICC may be fixedly embedded and used in a terminal, and a SIM module may be remotely downloaded in the eUICC or iUICC and may make it possible to be connected to a network service in a mobile communication provider network. An eUICC or an iUICC having a particular SIM module loaded at the time of manufacture may be launched and installed to a terminal. Software obtained by packaging SIM module information downloaded and used in an eUICC, information included in a USIM application, and authentication information for receiving a network service is commonly referred to as an eUICC profile. The eUICC profile may be referred to as an eSIM profile, an iUICC profile, a USIM profile, or, more briefly, a profile.

In the disclosure, a smart secure platform (SSP) is a security module capable of integrally supporting functions of a UICC and an eSE in a single chip, and may be briefly referred to as an SSP. SSPs may be classified into a removable SSP (rSSP), an embedded SSP (eSSP), and an integrated SSP (iSSP) embedded in a system-on-chip (SoC) of a terminal. An SSP may include one primary platform and at least one secondary platform bundle (SPB) operating on the primary platform. The primary platform may include at least one of a hardware platform and a low-level operating system (LLOS), and the secondary platform bundle may include at least one of a high-level operating system (HLOS) and an application driven on the HLOS.

In the disclosure, a secondary platform bundle (SPB) is driven on a primary platform (PP) of an SSP by using a PP resource. For example, a UICC bundle may refer to software obtained by packing an application, a file system, an authentication key value, etc., stored in an existing UICC and a high-level operating system (HLOS) in which the same operates. In the disclosure, the phrase "secondary platform bundle" may be referred to as a "bundle". That is, a secondary platform bundle is simply referred to as a bundle. A bundle may access resources such as a central processing unit, a memory, or the like of a primary platform through a primary platform interface (PPI), and may be driven on the primary platform therethrough. Communication applications such as the SIM, a universal SIM (USIM), and an IP multimedia SIM (ISIM) may be loaded in a bundle, and various types of applications such as an electronic wallet, ticketing, an electronic passport, and a digital key may also be loaded to the bundle. An SSP may be used for the above-described UICC or eSE according to a bundle that is remotely downloaded and installed, and multiple bundles may be installed and simultaneously operated in a single SSP so as to be used for both the UICC and the eSE. That is, when a bundle including a profile operates, an SSP may be used for a UICC for access to a mobile operator network. A corresponding UICC bundle may remotely download, like the eUICC or the iUICC, at least one profile into the bundle, and may select the at least one profile and then operate. Further, when a bundle, including a service control module having applications capable of providing services, such as an electronic wallet, ticketing, an electronic passport, or a digital key, operates on an SSP, the SSP may be used for the eSE. Multiple service control modules may be integrally installed and operated in one bundle, or may be installed and operated as independent bundles. An SSP may download, install, and use a bundle to be driven in the SSP from an external bundle-managing server (a secondary platform bundle manager or an SPB manager) by using over-the-air (OTA) technology. A method for downloading a bundle by OTA technology and installing the downloaded bundle in an SSP may be identically applied to a removable SSP (rSSP) capable of being inserted into or removed from a terminal, an embedded SSP (eSSP) installed in a terminal, and an integrated SSP (iSSP) included in an SoC installed in a terminal.

In the disclosure, a telecom bundle may be a bundle that has at least one network access application (NAA) loaded thereto, or having a function capable of remotely downloading and installing at least one NAA. The NAA, which is a module stored in a UICC and configured to access a network, may be a USIM or an ISIM. A telecom bundle may include a telecom family identifier which indicates a telecom family.

In the disclosure, an eSIM bundle, in which an eUICC OS is driven, may perform the same function as an eUICC, and thus may install a profile in the terminal to drive a network service. In the disclosure, the eSIM bundle may include a telecom family identifier indicating the same. An eSIM bundle may indicate the UICC bundle.

In the disclosure, a secondary platform bundle loader (SPBL) may be a management bundle configured to install and manage enabling, disabling, or deleting another bundle in an SSP. A remote server or a local bundle assistant (LBA) of a terminal may install, enable, disable, or delete a particular bundle through a loader. In the disclosure, the loader may also be referred an SSP.

2. Terminal and Local Bundle Assistant (LAB)

In the disclosure, a terminal (device) may be referred to as a "mobile station (MS)", "user equipment (UE)", "user terminal (UT)", "wireless terminal", "access terminal", "terminal", "subscriber unit", "subscriber station", "wireless device", "wireless communication device", "wireless transmit/receive unit (WTRU), "mobile node", "mobile", or other terms. Various examples of a terminal may include cellular phones, smartphones having a wireless communication function, personal digital assistants (PDAs) having a wireless communication function, wireless modems, portable computers having a wireless communication function, imaging devices such as a digital camera having a wireless communication function, gaming devices having wireless communication function, home appliances which store and reproduce music and have wireless communication function, internet home appliances allowing wireless internet connection and browsing, and portable units or terminals in which combinations of such functions are integrated. Further, examples of the terminal may include a (machine-to-machine (M2M) terminal and a machine-type communication (MTC) terminal/device, but are not limited thereto. In the disclosure, a terminal may also be referred to as an electronic device.

In the disclosure, an SSP configured to download and install a bundle may be embedded in a terminal. Further, an SSP physically separated from a terminal may be inserted into a slot of the terminal, in which the SSP can be installed, and may be connected to the terminal. For example, a card-shaped SSP may be inserted into a terminal. The terminal having the SSP installed therein may have an additional SSP embedded therein. A terminal including an SSP may be referred to as an SSP terminal.

In the disclosure, a local bundle assistant (LBA) is software or an application which is installed in a terminal and is capable of controlling an SSP in the terminal. The LBA may download a bundle to the SSP or may transfer, to the SSP, management commands to enable, disable, or delete a bundle preinstalled in the SSP. The terminal may include a local profile assistant (LPA) which is software or an application installed in the terminal so as to control an eUICC. The LPA may be implemented so as to be included as a subcomponent of a local bundle assistant (LBA), or may be installed as an application separate from the LBA in the terminal. The LPA may be software or an application capable of controlling an eSIM bundle, functionally similar to an eUICC, among bundles installed in an SSP of the terminal.

3. Service Provider

In the disclosure, a service provider may indicate a company that issues requirements to a bundle-managing server (secondary platform bundle manager) to request the bundle-managing server to generate a bundle and provides a service to a terminal through the bundle. For example, the service provider may indicate a mobile operator providing a communication network access service through a bundle in which a communication application is installed, and may be used as a term commonly indicating a business supporting system (BSS), an operational supporting system (OSS), a point-of-sale (POS) terminal), and other IT systems of a mobile operator. Further, in the disclosure, the service provider is not limited to expressing only a particular company, and may be used as a term that indicates an association or consortium of one or more companies or a representative representing the association or consortium.

Further, in the disclosure, the service provider may be a company or terminal manager that is capable of managing a bundle installed in a particular SSP terminal.

Further, in the disclosure, the service provider may be referred to as at least one among an operator, a bundle owner, an image owner, a service subscription manager, and a device subscription manager. Each service provider may configure or be allocated at least one name and/or unique identifier (an object identifier (OID)). If a service provider indicates an association or consortium of one or more companies or a representative thereof, the name or unique identifier of a predetermined association or consortium or a representative thereof may be a name or a unique identifier that is shared by all companies belonging to the association or consortium or by all companies cooperating with the representative.

4. Secondary Platform Bundle Manager (SPB Manager)

In the disclosure, a bundle-managing server may have a function of generating a bundle at the request of a service provider or another bundle-managing server, encrypting the generated bundle, generating a remote bundle management command, or encrypting the generated remote bundle management command. The bundle-managing server providing the function may be referred to as at least one among a secondary platform bundle manager (SPB manager), a remote bundle manager (RBM), an image delivery server (IDS), a subscription manager data preparation (SM-DP), a subscription manager data preparation plus (SM-DP+), a manager bundle server, a managing subscription manager data preparation plus (Managing SM-DP+), a bundle encrypting server, a bundle generation server, a bundle provisioner, a bundle provider, and a bundle provisioning credentials holder (BPC holder).

In some embodiments, a bundle-managing server may play a role of managing a configuration of a certificate or a key for: downloading, installing, or updating a bundle in an SSP; and remotely managing the state of the bundle. The bundle-managing server providing the function may be referred to as at least one among a secondary platform bundle manager (SPB manager), a remote bundle manager (RBM), an image delivery server (IDS), a subscription manager secure routing (SM-SR), a subscription manager secure routing plus (SM-SR+), an off-card entity of an eUICC profile manager or a profile management credentials holder (PMC holder), and an eUICC manager (EM). The bundle-managing server may be a server for managing an SSP for a machine-to-machine (M2M) service or an SSP for an IoT service.

5. Bundle Management

In the disclosure, bundle management may be a term that includes changing (enabling, disabling, or deleting) the state of each of the bundles installed in an SSP, updating metadata of the bundles installed in the SSP, acquiring a list of the bundles installed in the SSP, installing bundles in the SSP, etc.

The bundle management may be classified into local bundle management (LBM) and remote bundle management.

The local bundle management (LBM) is an operation, which is performed by direct use of an SSP terminal, for managing an SSP and a bundle installed in the SSP through software in the SSP terminal. The local bundle management (LBM) may be referred to as a bundle local management or a local management. A terminal software LBA of the SSP terminal may transfer, to the SSP, a local bundle management command including information about a bundle to be subjected to local bundle management and a specific operation to be performed. The local bundle management command may be a local management command or a local command. A local bundle management package (LBM package) may include at least one local bundle management command transferred from the terminal software LBA to a secondary platform bundle loader (SPBL, loader). The local bundle management package may be referred to as a bundle local management package, a local management package, a local management command package, or a local command package.

A user of an SSP terminal may perform local bundle management through software which is authorized to access a local bundle assistant (LBA) or an SSP installed in the terminal. The local bundle management may include changing the (enabled, disabled, deleted) state of a target bundle or updating some pieces of information about the target bundle or some values of the target bundle. Updating some pieces of information about the target bundle or some values of the target bundle may be updating information in bundle metadata. The target bundle may be used as a term indicating a bundle to be subjected to local bundle management.

The remote bundle management may be an operation that is performed by a command transmitted from an external server, that is, a service provider, a remote management server, or a bundle-managing server (secondary platform bundle manager (SPB manager), so as to manage an SSP and a bundle installed in the SSP through software in the SSP terminal. The remote bundle management (RBM) may be referred to as a bundle remote management or a remote management.

A service provider or a terminal owner (device owner) may generate a remote bundle management command including information about a bundle to be subject to remote bundle management and a specific operation to be performed. The remote bundle management command may be referred to as a remote management command or a remote command. A remote bundle management command may be transferred from a bundle-managing server (SPB manager) to a terminal software LBA of an SSP terminal in which the remote bundle management command is to be performed. The remote bundle management command may be transferred to a secondary platform bundle loader (SPBL or loader) by the terminal software LBA of the SSP terminal so that bundle management may be performed based on the command.

A remote bundle management package (RBM package) may include one or more remote bundle management command(s) that is generated by an external server, is transferred from the external server to an SSP terminal software LBA, and is transferred from the terminal software LBA to the secondary platform bundle loader. The remote bundle management package may be referred to as a bundle remote management package, a remote management package, a remote management command package, or a remote command package.

In the disclosure, an operation of enabling a bundle by a terminal or an external server may be an operation of changing the state of a corresponding profile to an enabled state to allow the terminal to receive services provided by the bundle (e.g., a communication service, a credit card payment service, a user authentication service, or the like through a mobile operator). A bundle in an enabled state may be expressed as an "enabled bundle". The enabled bundle may be encrypted and stored in a storage space inside or outside an SSP. In the disclosure, an enabled bundle (an enabled secondary platform bundle) switches to a driven state (Active) according to an input from outside the bundle (e.g., a user input, a push, a request from an application in a terminal, an authentication request from a mobile operator, a PP management message, etc.) or an operation inside the bundle (e.g., a timer or polling). A bundle in the driven state may be a bundle that is loaded in a driving memory in an SSP in the storage space inside or outside the SSP, processes security information by using a security control device (a secure CPU) in the SSP, and provides a security service to the terminal.

In the disclosure, an operation of disabling a bundle by a terminal or an external server may be an operation of changing the state of the bundle to a disabled state such that the terminal cannot receive a service provided by the bundle. A profile in a disabled state may be expressed as a "disabled bundle (disabled secondary platform bundle)". A bundle in an disabled state may be encrypted and stored in a storage space inside or outside an SSP.

6. Identifier (spbId, F.ID, CID, PPID)

In the disclosure, a bundle identifier is a value indicating a particular bundle. The bundle identifier may be referred to as a secondary platform bundle identifier (SPBID, sbpId). The bundle identifier may be generated by a service provider or a bundle-managing server when the service provider gives ordering for bundle generation (bundle ordering) to a bundle-managing server (SPB manager). The bundle identifier may be used as a value capable of indexing a bundle in the bundle-managing server. The bundle identifier may be a value that is matched to a bundle matching identifier or an event identifier and managed in the bundle-managing server. The bundle identifier may indicate a unique identifier of each bundle.

In the disclosure, a bundle family identifier may refer to a service provided by a bundle or an organization, a government, or an institution that provides and manages the service, or may be a value indicating an ecosystem in which a bundle is managed. The bundle family identifier may be referred to as a secondary platform bundle family identifier or a family identifier (F.ID). Example of the types of bundles distinguishable by using the bundle family identifier may include a telecom bundle for access to a mobile communication network, a bank bundle for card and financial services, a digital key bundle for a digital key service, an ID card bundle such as a passport/residence registration card/driver's license, etc.

In the disclosure, a custodian identifier (CID) may indicate an identifier of an organization for managing a particular family identifier. A custodian object identifier may be used as an example of the CID. The custodian object identifier may indicate an object identifier of an organization for managing a particular family identifier. There may be multiple organizations for managing the particular family identifier, and each of the organizations may have a CID. An SSP terminal, a service provider, and a bundle-managing server may determine, through the CID, which organization is a management subject for a bundle that is to be subject to bundle management including downloading. Further, the SSP terminal, the service provider, and the bundle-managing server may determine, through the CID, which management subject manages a service to be provided through the bundle.

In the disclosure, an SSP identifier may be a unique identifier of an SSP embedded in a terminal. Further, when the terminal and an SSP chip are not separated, the SSP identifier may be used while being linked with an identifier of the SSP terminal. Further, in some cases, a bundle identifier of a particular bundle in an SSP may be used as an SSP identifier. The identifier of the particular bundle may be an identifier of a secondary platform bundle loader (SPBL), which is a management bundle configured to manage installing, enabling, disabling, or deleting another bundle in the SSP.

A unique SSP identifier may be an identification code or string assigned by an SSP maker which generates an SSP, and may be a globally unique value for identifying a particular SSP. Further, once a unique SSP identifier is assigned to a particular SSP, the unique SSP identifier may have an immutable value. A primary platform, which is one of SSP elements, may have a unique SSP identifier, and the unique SSP identifier may be referred to as a primary platform identifier (PPID). The primary platform identifier may also be used as a unique SSP identifier.

An SSP may have multiple temporary SSP identifiers, and the multiple temporary SSP identifiers may be values induced from a unique SSP identifier. A temporary SSP identifier may be a value generated through a mathematical function by combining a unique SSP identifier with another type of information.

A unique SSP identifier may be referred to as a first SSP identifier, and a temporary SSP identifier may be referred to as a second SSP identifier. The SSP identifier may be used as a term commonly indicating the first SSP identifier and the second SSP identifier.

An eUICC may have multiple temporary eUICC identifiers, and the multiple temporary eUICC identifiers may be values induced from a unique eUICC identifier. A temporary eUICC identifier may be a value generated through a mathematical function by combining a unique eUICC identifier with another type of information. A temporary eUICC identifier may be referred to as an obfuscated EID (OEID).

A unique eUICC identifier may be referred to as a first eUICC identifier, and a temporary eUICC identifier may be referred to as a second eUICC identifier. The eUICC identifier may be used as a term commonly indicating the first eUICC identifier and the second 2 eUICC identifier.

7. Discovery Service

In the disclosure, an event may be a term indicating ordering or requesting for bundle download, remote bundle provisioning, remote bundle management, or other bundle or SSP management/processing. The event may indicate a request of a service provider or an SSP device owner that causes a particular SSP terminal to perform at least one of bundle management operations (bundle installation, bundle downloading, remote bundle provisioning, remote bundle deleting, remote bundle enabling, remote bundle disabling, remote bundle metadata updating, remote bundle list management, and other bundle management operations). The event may occur through a series of orderings and commands that a service provider gives to a bundle-managing server (SPB manager) through an interface between the service provider and the bundle-managing server. An event transferred to an SSP terminal may be referred to as an SSP discovery service (SSPDS) event.

In the disclosure, an event-managing server is a server for managing an event to be processed by an SSP terminal. The event-managing server may receive event registration requests (Register Event Request, Event Register Request) from one or more bundle-managing servers, and may register events in the servers. Further, the one or more event-managing servers are complexly used. In this case, a first event-managing server may receive an event registration request from not only a bundle-managing server but also second event-managing server. In the disclosure, the function of the event-managing server may be operated while being integrated with that of a bundle-managing server (SPB manager). The event-managing server may be referred to as at least one among a secondary platform bundle manager (SPB manager), a remote bundle manager (RBM), a secondary platform bundle manager-discovery sever (SPBM-DS), a bundle discovery sever (BDS), a subscription manager discovery service (SM-DS), a discovery service (DS), a root event-managing server (root SM-DS), an alternative event-managing server (alternative SM-DS), and an SSP discovery service (SSPDS). In a specific embodiment, the event-managing server may be mainly referred to as a secondary platform bundle manager-discovery server (SPBM-DS) or an SSP discovery service (SSPDS), but may be applied to a server that performs the same function with a predetermined name, regardless of naming of an object.

In the disclosure, an event identifier (event ID) may be used to identify a particular event, and may be generated by a service provider or a bundle-managing server (SPB manager) when the service provider causes a particular event to occur in the bundle-managing server. An event identifier may be generated by a service provider, a bundle-managing server, or an event-managing server when the service provider or the bundle-managing server registers an event in the event-managing server.

In the disclosure, an event list may include the presence or absence of an event package to be processed by an SSP terminal receiving the event list, the number of events, or a brief description of each event.

In the disclosure, an event package may include multiple event records. The event package may be configured by packaging event records that are to be performed by the same SSP terminal.

In the disclosure, event record may be referred to as data including at least one among: an event identifier, a matching identifier (Matching ID, MatchingID), an address (FQDN, IP address, or URL) of a bundle-managing server or an event-managing server in which a corresponding event is registered, or each server identifier. A bundle download may be interchangeably used with bundle installation. Further, the term "event type" may be used to indicate whether a particular event is bundle download, remote bundle management (e.g., deletion, enabling, disabling, replacement, updating, etc.), or other bundle or SSP management/processing commands, and may be called an operation type (or OperationType), an operation class (or OperationClass), an event request type, an event class, an event request class, etc.

In the disclosure, a discovery service configuration may be a configuration related to an operation of accessing an event-managing server, requesting an event list or an event package, and receiving the event list or the event package. The discovery service configuration may be made in an SPBL or an LBA of an SSP terminal. The discovery service configuration may include an address of an event-managing server to which an SSP terminal makes a request for an event list or an event package. Further, the discovery service configuration may include addresses of multiple event-managing servers which are to be classified and used according to a family identifier, a CID, and a bundle identifier.

8. Activation Code

In the disclosure, an eSIM enabling code is a predetermined type of information for downloading a profile to an eSIM terminal or an SSP terminal, and may be referred to as an eSIM activation code. The eSIM activation code may include an SM-DP+ address to be connected for downloading a profile or an address of an SM-DS server capable of providing a notification of the SM-DP+ address, and may include activation code token value usable as a matching identifier of a particular profile with respect to SM-DP+. When an eSIM activation code is input in the form of a QR code, "LPA:" may be attached as a prefix of data contained in the QR code.

In the disclosure, an SSP enabling code is a predetermined type of information for downloading a bundle to an SSP terminal, and may be referred to as an SSP activation code. A terminal user may start a bundle download procedure by inputting an SSP activation code into an LBA application of an SSP terminal. An SSP activation code may include an eSIM activation code.

In the disclosure, an activation code may indicate all of an SSP activation code and an eSIM activation code. Typically, in the disclosure, an activation code may be a predetermined activation code before the same is determined to be an SSP activation code or an eSIM activation code, and may be interpreted by a terminal as one of an SSP activation code or an eSIM activation code when being input into the terminal. When an SSP activation code includes an eSIM activation code, a terminal may selectively perform bundle download or profile download.

9. Si2, Si3 Interface

In the disclosure, a function called by an LBA may be a function performed in a Si2 interface, which is an interface between the LBA and an SPB manager, and a Si3 interface, which is an interface between the LBA and a secondary platform bundle loader. The LBA may transfer parameters to the SPB manager or the secondary platform bundle loader through a particular function. The parameters transferred from the LBA through a call of the particular function may be referred to as function instructions, function commands, or commands of the corresponding function. The SPB manager or the secondary platform bundle loader, which received a function command, may perform a particular operation based on the function command, and may then provide a response to the function command. The response may include parameters. Function command transfer through the Si2 interface may be performed using a hypertext transfer protocol (HTTP). In particular, for the function command transfer through the Si2 interface, an HTTP POST request message of the hypertext transfer protocol (HTTP) may be used, and a command may be transmitted while being included in the body of the HTTP POST request message.

10. SSP Information

In the disclosure, SSP information may indicate all of first SSP information and second SSP information.

The first SSP information may be information related to an SSP, and may be data that has not been encrypted. The first SSP information may include a number of a standard document supported by an SSP. An LBA and an SPB manager may analyze the first SSP information without any special decoding process.

The second SSP information is sensitive information, and may be data obtained by encrypting information related to an SSP. Second SSP information of an SSP supporting a telecom service may include eUICC information which is defined in the GSMA SGP.22 standard.

11. Bound SPB Image and SPB Metadata

In the disclosure, first bundle information may be metadata, bundle metadata, or secondary platform bundle metadata (SPB metadata). The first bundle information may include information that has not been encrypted and is readable by an LBA of an SSP terminal with respect to a bundle that a service provider or a bundle-managing server (SPB manager) is to download to the SSP. The LBA of the SSP terminal may receive, based on the first bundle information, a consent from a user before receiving second bundle information about the bundle, or may determine whether to request the user's consent or intention with respect to operation/management after bundle installation. The first bundle information may be used when the LAB shows basic information about the bundle to the user before bundle installation. After the bundle installation, the first bundle information may be managed by a loader (secondary platform bundle loader(SPBL), and may be updated by a service provider, a bundle-managing server (SPB manager), etc.

In the disclosure, encrypted second bundle information may be a bound secondary platform bundle image, a bound bundle (a bound secondary platform bundle), an encrypted secondary platform bundle image, or an encrypted bundle (an encrypted secondary platform bundle). The second bundle information may include the first bundle information. The second bundle information includes information necessary for bundle installation, and the SSP may install a bundle in the SSP by using data extracted from the second bundle information. The second bundle information may be partially encrypted as a session key generated by the SSP and the SPB manager.

In the disclosure, a bundle information request function may be a function requesting first bundle information and second bundle information about a bundle which an SSP terminal desires to install. The operation of requesting the first bundle information and the second bundle information about the bundle may be performed by transmitting a bundle information request function command to an SPB manager. The bundle information request function command may be transferred to the SPB manager by the SSP terminal through the Si2 interface. The SSP terminal may transfer, to the SPB manager, terminal information and an SSP credential which includes a certificate of an SSP, SSP information, and a capability of the SSP, to request the first bundle information or the second bundle information.

In describing the disclosure, a detailed description of related known configurations or functions incorporated herein will be omitted when it is determined that the detailed description thereof may unnecessarily obscure the subject matter of the disclosure.

Hereinafter, a description will be made of various embodiments of: a procedure in which a service provider causes an event, which is to be performed in a particular SSP, to occur in a bundle-managing server (SPB manager); a procedure in which the bundle-managing server (SPB manager) registers the event in an event-managing server; a procedure in which an SSP terminal determines whether there is an event in the event-managing server; a procedure in which the SSP terminal requests an event package from the event-managing server and receives the event package; and detailed operations of the event-managing server (discovery service) and the SSP terminal in the procedures.

Particularly, in the disclosure, the following embodiments for the above-described aspect is included.

A method in which a service provider, a bundle-managing server (secondary platform bundle manager), or an event-managing server links a first SSP identifier (a unique SSP identifier) with an event to be performed in a particular SSP on the basis of the first SSP identifier (the unique SSP identifier) and manages the first SSP identifier and the event.

A method in which the service provider, the bundle-managing server (secondary platform bundle manager), or the event-managing server generates a second SSP identifier (a temporary SSP identifier) by using the first SSP identifier (the unique SSP identifier), links the generated second SSP identifier with an event, and manages the second SSP identifier and the event.

A method in which an SSP terminal software LBA generates the second SSP identifier (the temporary SSP identifier) by using the first SSP identifier (the unique SSP identifier).

In the method for generating the temporary SSP identifier, a method for generating the temporary SSP identifier by combining the unique SSP identifier and information about the event-managing server.

A method in which the SSP terminal software LBA determines, using the temporary SSP identifier, whether there is an event package in the event-managing server.

A method in which the event-managing server determines, using a temporary SSP identifier transmitted by the SSP terminal, whether there is an event package to be processed by the SSP terminal.

A method in which the SSP terminal software LBA determines the presence of an event package from the event-managing server, and then receives the event package through a procedure of mutual authentication between an SSP installed in a terminal and the event-managing server.

FIG. 1 illustrates an example of an interface between elements inside an SSP terminal according to embodiments of the present disclosure.

According to FIG. 1, an SSP terminal 101 includes a local bundle assistant (LBA) 111, which is a terminal software, and an SSP 131. Further, the SSP terminal 101 may include: a transceiver configured to transmit or receive signals to or from another terminal, a base station, a server, etc.; and a controller configured to control overall operations of the SSP terminal 101. The controller may control an operation of an SSP terminal according to various embodiments. The controller may include at least one processor. The controller may control the SSP 131 through the LBA 111.

The SSP 131 includes a primary platform 135, a primary platform interface 134, and a secondary platform bundle 133. The primary platform 135 includes a hardware platform and a low-level operating system. The secondary platform bundle 133 may be referred to as a bundle. The bundle includes an application and a high-level operating system (HLOS), driven on the primary platform 135. A secondary platform bundle loader 132 may be referred to as an SPB loader or a loader. The loader 132 is a type of bundle 133, and may be a system bundle having special authority to manage the bundle 133 installed in the SSP. The terminal software LBA 111 and the loader 132 interchange instructions and information through a first interface 122. The first interface 122 may be referred to as an Si3 interface. The LBA 111 may perform the following operations through the first interface:

Acquiring first SSP information from the loader 132, and acquiring an SSP credential;

Transmitting a server credential;

Transmitting bundle data to be installed in the SSP to the loader 132; and

Managing a bundle installed in the SSP (enabling, disabling, deleting, bundle metadata updating, managing a list of installed bundles, etc.).

Figure 2:
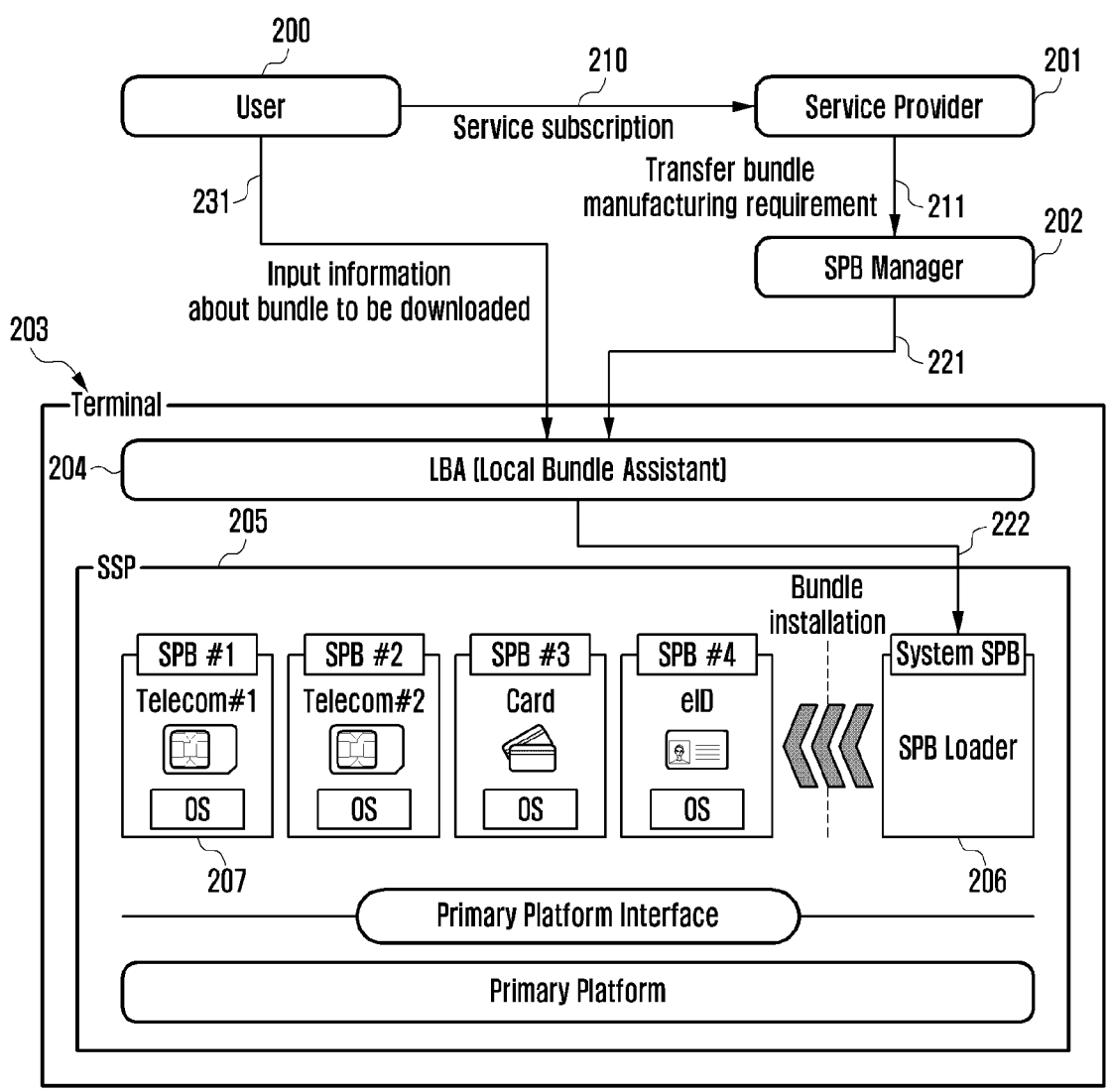
FIG. 2 illustrates an example of elements that are disposed inside and outside an SSP terminal such that the SSP terminal can download a bundle according to embodiments of the present disclosure.

FIG. 2 illustrates an example of elements that are disposed inside and outside an SSP terminal such that the SSP terminal can download a bundle according to embodiments of the present disclosure. A terminal 203 may correspond to the SSP terminal 101 in FIG. 1. An LBA 204 may correspond to the LBA 111 in FIG. 1. An SPB loader 206 may correspond to the secondary platform bundle loader 132 in FIG. 1. A bundle 207 may be the secondary platform bundle 133 in FIG. 1. A description of the terminal 203, the LBA 204, and the SPB loader 206 will be made with reference to the embodiment of FIG. 1.

According to FIG. 2, a user 200 may select and subscribe to a service (e.g., a call or data service through a mobile communication network) provided by a service provider 201 in a service subscription process 210. In the service subscription process 210, the user 200 may pay the service provider 201 a predetermined amount of money or a subscription fee for the service, and the service provider 201 may provide the user 200 with a predetermined type of information for installing the bundle 207, from which the service can be received, in the terminal 203 of the user. In the service subscription process 210, in order to use the service provided by the service provider 201, the user 200 may selectively transfer, to the service provider 201, an SSP identifier of the SSP 205 in the terminal 203 in which the bundle 207 is to be installed. The SSP identifier transferred to the service provider 201 in the service subscription process 210 may also allow the bundle 207 purchased by the user 200 to be installed only in the SSP 205 having the SSP identifier.

According to some embodiments, in the service subscription process 210 of FIG. 2, the user 200 may receive, as the predetermined type of information necessary for installing the bundle 207 in the terminal 203, an SSP activation code issued from the service provider 201. The SSP activation code may be issued in the form of a QR code, or may be issued in the form of a string or a link of a uniform resource identifier (URI) format through e-mail, text, or an application linked with the service provider. According to some embodiments, an SSP activation code, with which the user 200 is provided after subscribing to a telecom service, may include both information for downloading a telecom bundle and an eSIM activation code for downloading an eSIM profile instead of the telecom bundle.

In a bundle manufacturing requirement transfer process 211, the service provider 201 and an SPB manager 202 may perform a bundle download preparation procedure. In the bundle manufacturing requirement transfer process 211, the service provider 201 may selectively transfer, to the SPB manager 202, an identifier (SSP ID) of the SSP 205 in which a bundle is to be installed, and may transfer, to the SPB manager 202, at least one of a particular bundle identifier (SPB ID) and a bundle family identifier (SPB Family ID), which are capable of providing a service selected by a subscriber. In the bundle manufacturing requirement transfer process 211, the SPB manager 202 may select one of a bundle having the transferred particular bundle identifier or a bundle having the transferred bundle family identifier, and may transfer an identifier of the selected bundle to the service provider 201. In the bundle manufacturing requirement transfer process 211, the service provider 201 or the SPB manager 202 may newly generate a bundle matching ID capable of distinguishing the selected bundle. The bundle matching ID capable of distinguishing the bundle may be referred to as a "CODE M". Further, the SPB manager 202 may connect the transferred SSP identifier (SSP ID) and the selected bundle to each other and may manage the same. In the bundle manufacturing requirement transfer process 211, the SPB manager 202 may transfer, to the service provider 201, a bundle-managing server address (SPB manager address) from which the selected bundle can be downloaded. The bundle-managing server address may be a specified or temporary address of a bundle-managing server in which a prepared bundle is stored, and may be an address of another bundle-managing server into and from which download information (server address, etc.) of the prepared bundle can be stored and acquired. In the bundle manufacturing requirement transfer process 211, when the service provider 201 requests the SPB manager 202 to prepare a telecom bundle, the service provider 201 may provide information about an eSIM profile that is matched to the telecom bundle.

When a part of the bundle manufacturing requirement transfer process 211 precedes the service subscription process 210, the service provider 201 may transfer download information of the prepared bundle to the user 200 in the service subscription process 210. The bundle download information may selectively transfer at least one among a bundle-managing server address (SPB manager address) at which a bundle is prepared, a bundle matching ID of the prepared bundle, and a bundle family identifier (family identifier) of the prepared bundle.

Referring to FIG. 2, in a process 231 for inputting information about a bundle to be downloaded, bundle download information may be transferred to the LBA 204 of the terminal 203. The bundle download information may be at least one among: a bundle-managing server address (SPB manager address) to which the LBA 204 is to be connected, an identifier of the bundle prepared in the bundle manufacturing requirement transfer process 211, and a bundle family identifier of the prepared bundle. The bundle identifier may include at least one of a bundle event ID or a bundle matching ID generated in the bundle manufacturing requirement transfer process 211. Further, the bundle identifier may include the bundle family identifier of the prepared bundle. The bundle event ID may include at least one of a bundle matching ID of a bundle prepared in the bundle manufacturing requirement transfer process 211 and a bundle-managing server address. The bundle download information may be input into the LBA 204 by inputting of an SSP activation code into the LBA 204 by the user 200 (e.g., by performing QR code scanning, direct text input, etc.) or by using a push input through an information providing server (not shown). Further, the LBA 204 may access an information providing server (not shown) preconfigured in the terminal 203 to receive the bundle download information.

The bundle download from the SPB manager 202 to the SSP 205 may be implemented by a function and an operation performed in an interface 221 between the SPB manager 202 and the LBA 204 and in an interface 222 between the LBA 204 and the SPB loader 206. The interface 222 between the LBA 204 and the SPB loader 206 may correspond to the first interface 122 in FIG. 1. The interface 222 between the LBA 204 and the SPB loader 206 may be called a Si3 interface.

Figure 3:
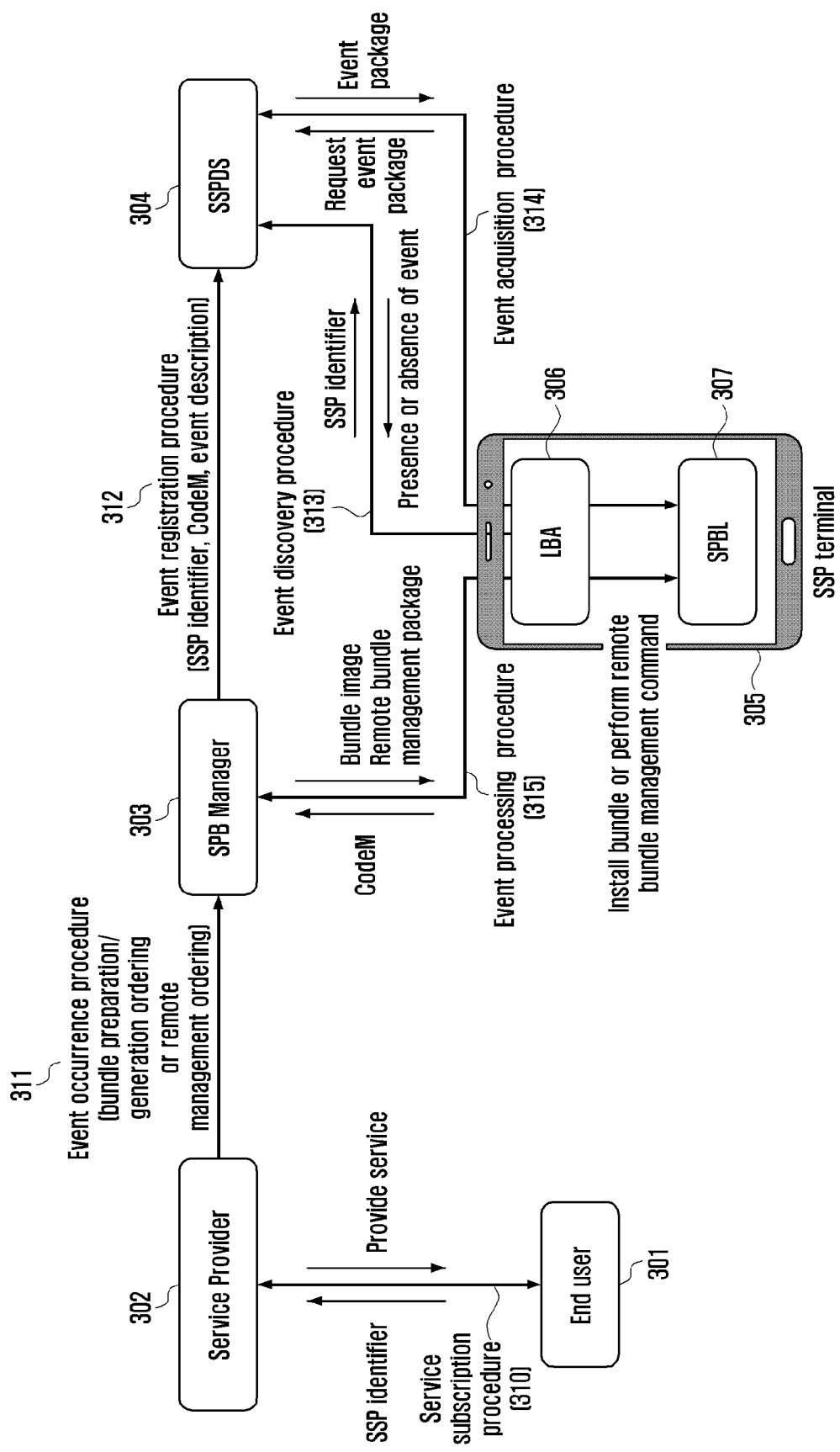
FIG. 3 illustrates a process performed between entities when an SSP terminal receives an event generated by a service provider according to embodiments of the present disclosure.

FIG. 3 illustrates a process between entities when an SSP terminal receives an event generated by a service provider according to embodiments of the present disclosure.

Referring to FIG. 3, the entire process in which an SSP terminal 305 receives and processes an event occurring from a service provider 302 may be performed in order of a service subscription procedure 310, an event occurrence procedure 311, an event registration procedure 312, an event presence/absence determination procedure 313, an event package request procedure 314, and an event processing procedure 315. In the above-described process, the service subscription procedure 310 may be omitted when an event to be performed in the event processing procedure 315 does not correspond to bundle installation (e.g., corresponds to remote bundle management).

Further, the event occurrence procedure 311 performed once may cause an SPB manager 303 to perform the event registration procedure 312 several times, or may cause the SPB manager 303 to periodically perform the event registration procedure 312.

A user 301 may perform the service subscription procedure 310 with respect to a service provider 302. The service subscription procedure 310 may include a process in which the user 301 pays the service provider 302 a predetermined amount of money for a service to be provided through a bundle and purchases the bundle.

In the service subscription procedure 310, the user 301 may transfer an SSP identifier of the user's own SSP terminal 305 to the service provider 302. In the service subscription procedure 310, the user 301 may transfer, to the service provider 302, a discovery service configuration that is made in the user's own SSP terminal 305.

The service provider 302 may perform the event occurrence procedure 311 with respect to the SPB manager (bundle-managing server) 303. The event occurrence procedure 311 may be one of the following operations.

Bundle Ordering. Bundle ordering may be performed before or after the service subscription procedure 310. The bundle ordering may request the service provider 302 to perform a preparation process for transferring a bundle, which satisfies a specific condition among multiple bundles managed by the SPB manager 303, to an SSP terminal later. The SPB manager 303 may prepare, through the bundle ordering, a reference value capable of indicating a bundle to be prepared. The reference value may be referred to as MatchingID, Code matchingID, or CodeM.

Bundle Generation Ordering. Bundle generation ordering may be performed before or after the service subscription procedure 310. The bundle generation ordering may be a procedure in which the service provider 302 requests the SPB manager 303 to generate a bundle satisfying a particular condition. In the bundle generation ordering procedure, the SPB manager 303 may prepare and manage a bundle such that the bundle can be transferred to a particular SSP terminal. The SPB manager 303 may prepare, through the bundle generation ordering, a reference value capable of indicating a bundle to be generated. The reference value may be referred to as MatchingID or Code MatchingID.

Remote Bundle Management Ordering. The service provider 302 may request remote bundle management from the SPB manager 303 in order to remotely manage a bundle preinstalled in a particular SSP terminal.

Remote Bundle Management Command Generation Ordering. The service provider 302 may request the SPB manager 303 to generate remote bundle management commands in order to remotely manage a bundle preinstalled in a particular SSP terminal.

Through the event occurrence procedure 311, the SPB manager 303 may generate a secondary platform bundle image that is to be transferred to the SSP terminal, may prepare for secondary platform bundle image generation, may generate a remote bundle management package, or may prepare for remote bundle management package generation. When the SSP terminal 305 requests bundle download or a remote bundle management package from the SPB manager 303 later, if an event corresponding thereto is managed, The second bundle information may allow the SSP terminal 305 to perform a bundle download or remote bundle management procedure.

The SPB manager 303 may perform the event registration procedure 312 with respect to an SSPDS 304.

In the event registration procedure 312, the SPB manager 303 may register the event, which is managed by the SPB manager 303 through the event occurrence procedure 311, in the SSPDS 304. In the event registration procedure 312, information that the SPB manager 303 transfers to the SSPDS 304 may include some or all of the following items.

A first SSP identifier of an SSP that is to perform an event.

A second SSP identifier of the SSP that is to perform an event.

An event description. The event description may indicate whether a corresponding event is bundle installation or remote bundle management. Further, the event description may also include the name of the service provider 302 causing the corresponding event to occur, a related family identifier, or a CID. Alternatively, the event description may also include other additional explanations related to the event.

A code matching identifier (CodeM): The code matching identifier (CodeM) may be transferred to the SPB manager 303 by the SSP terminal later and used to perform an event. When the event is bundle installation, the code matching identifier (CodeM) may be an identifier indicating a particular bundle managed by the SPB manager 303. When the event is remote bundle management, the code matching identifier (CodeM) may be an identifier indicating a package which includes a remote bundle management command managed by the SPB manager 303.

In the event registration procedure 312, the SSPDS 304 may manage an event in the following manners. The following types of information may be managed with respect to one event. The types of information managed together with respect to one event may include some or all of the following types of information depending on the type of the event.

An event identifier (event ID).

A first SSP identifier of an SSP in which event is to be processed.

A second SSP identifier of the SSP in which event is to be processed.

An address (FQDN, etc.) of an SPB manager that an SSP terminal is to access for event processing.

A code matching identifier (CodeM) that the SSP terminal is to transfer to the SPB manager for event processing.

An event description.

An identifier (secondary platform bundle identifier) of a bundle subject to remote bundle management or a bundle to be installed.

A family identifier of the bundle subject to remote bundle management or the bundle to be installed.

A custodian object identifier or CID of the bundle subject to remote bundle management or the bundle to be installed.

Reference may be made to the following Table as an example in which the SSPDS 304 manages events registered in the SSPDS 304 through the event registration procedure 312. The following Table may be an example showing events managed based the above described embodiment.

TABLE 1

| Event ID | First SSP ID | Second SSP ID | SPB Manager Address | CodeM | Event description | SPB ID | Family ID | Custodian OID |
|---|---|---|---|---|---|---|---|---|
| aaaa111 | dddd1234 | efcd1234 | www.spbm.com | zdfbv3123 | Bundle Download | — | TelecomID | AT&T |
| bbbb222 | eeee1234 | sadfa1234 | www.spbm2.com | 123sdf3d | Remote Bundle Activation | dfsdf3431 | Digital Key ID | BMW |

An LBA 306 of the SSP terminal 305 may determine, through the event discovery procedure 313, whether there is an event to be processed.

In the procedure 313, the LBA 306 may request an event list from the SSPDS 304. In the procedure 313, the LBA 306 and the SSPDS 304 may form a security channel through TLS connection. The LBA 306 may generate a second SSP identifier, and may transfer the second SSP identifier to the SSPDS. The second SSP identifier may be generated as follows:
  i. The second SSP identifier may be generated by hashing a first SSP identifier by means of an SHA-1 or SHA-2 hash function. The second SSP identifier may also be generated using a function that is different from the SHA-1 or SHA-2 hash function in the process of generating the second SSP identifier.
  ii. The second SSP identifier may be generated by hashing a string, in which a first SSP identifier is combined with information about the SSPDS 304, by means of the SHA-1 or SHA-2 hash function. The second SSP identifier may also be generated using a function that is different from the SHA-1 or SHA-2 hash function in the process of generating the second SSP identifier. The information about the SSPDS 304 may be one or some of values such as an object identifier, a fully qualified domain name (FQDN), a uniform resource locator (URL), an IP address, or the like of the SSPDS 304, or may be information generated by combining the values in various methods. The information about the SSPDS 304 may be information related to the SSPDS 304, other than the above-described information. The first SSP identifier and the information about the SSPDS 304 may be combined with each other by various methods such as concatenation of strings to be combined (string concatenating) or XOR calculation.
  iii. The second SSP identifier may be generated using a function that is different from the SHA-1 or SHA-2 hash function in the process of generating the second SSP identifier. A function input value may be configured by combining pieces of information known to both the SSP terminal 305 and the SSPDS 304. The information may be one or some of values such as a first SSP identifier of the SSP terminal 305 and values such as an object identifier, a fully qualified domain name (FQDN), a uniform resource locator (URL), an IP address, or the like of the SSPDS 304, or may be information generated by combining the values in various methods.

In an example of generation of a second SSP identifier, when an SSP terminal, the primary platform identifier of which is "ABCD1234", desires to access an SSPDS, the FQDN of which is "WWW.SPBMDS.COM", and to request the SSPDS to determine whether there is an event to be performed by the SSP terminal, the SSP terminal may generate the second SSP identifier as follows.

i. Second SSP identifier=SHA-2 (ABCD1234WWW.SPBMDS.COM)

SHA-2 ("string") is a value obtained by hashing "string" by means of an SHA-2 hash function.

In the procedure 313, the LBA 306 may transfer the first SSP identifier.

In the procedure 313, the LBA 306 may transfer the second SSP identifier to the SSPDS 304.

In the procedure 313, the LBA 306 may transfer both the first SSP identifier and the second SSP identifier.

In the procedure 313, through the second SSP identifier transferred from the LBA 306, the SSPDS 304 may determine whether there is an event to be performed by the SSP terminal 305 as follows.
  i. Determining whether there is an event indexed by the transferred second SSP identifier among events managed by the SSPDS 304. If a first SSP identifier is received from the LBA 306, determining whether there is an event indexed by the first SSP identifier.
  ii. Second SSP identifier in which an event managed by the SSPDS 304 is to be performed.
  iii. First SSP identifier in which an event managed by the SSPDS 304 is to be performed.

According to some embodiments, the event discovery procedure 313 is omitted and the event acquisition procedure 314 may be performed. Further, although not illustrated, the event discovery procedure 313 may be replaced with a procedure in which the SSPDS 304 notifies the SSP terminal 305 of the presence of an event by using a push message.

In the event package request procedure 314, the SSP terminal 305 may request an event package from the SSPDS 304. The event package request procedure 314 may begin from a process in which the SSP terminal 305 sends an event package request message to the SSPDS 304. The procedure 314 may include a procedure of performing mutual authentication with the SSPDS 304 on the basis of a certificate of an SPBL 307 in the SSP terminal 305 and a certificate of the SSPDS 304. In the procedure 314, when there is an event package to be transferred to the SSP terminal 305 having requested the event package, the SSPDS 304 may transfer the event package to the SSP terminal 305. At this time, for the integrity of event package data, the SSPDS 304 may generate a digital signature in information including the event package and may transfer the digital signature. The digital signature may be verified using the certificate of the SSPDS 304. When the SSP terminal 305 receives the signature of the SSPDS 304 in the procedure 314, the LBA 306 may transfer the event package and the certificate, the certificate chain, and the digital signature of the SSPDS 304 to the SPBL 307, and may verify the signature, thereby verifying the integrity of the event package data.

In the event processing procedure 315, the SSP terminal 305 may perform an event on the basis of information about the event package received in the event package request procedure 314. In procedure 315, the SSP terminal 305 may perform a bundle download procedure or a remote bundle management package request procedure with the SPB manager 303 corresponding to SPB manager information included in the received event package. In procedure 315, the SSP terminal 305 may transfer, to the SPB manager 303, the information included in the event package received in the procedure 314, and may make a request to the SPB manager 303 for a bundle to be installed or a remote bundle management command to be executed.

Figure 4:
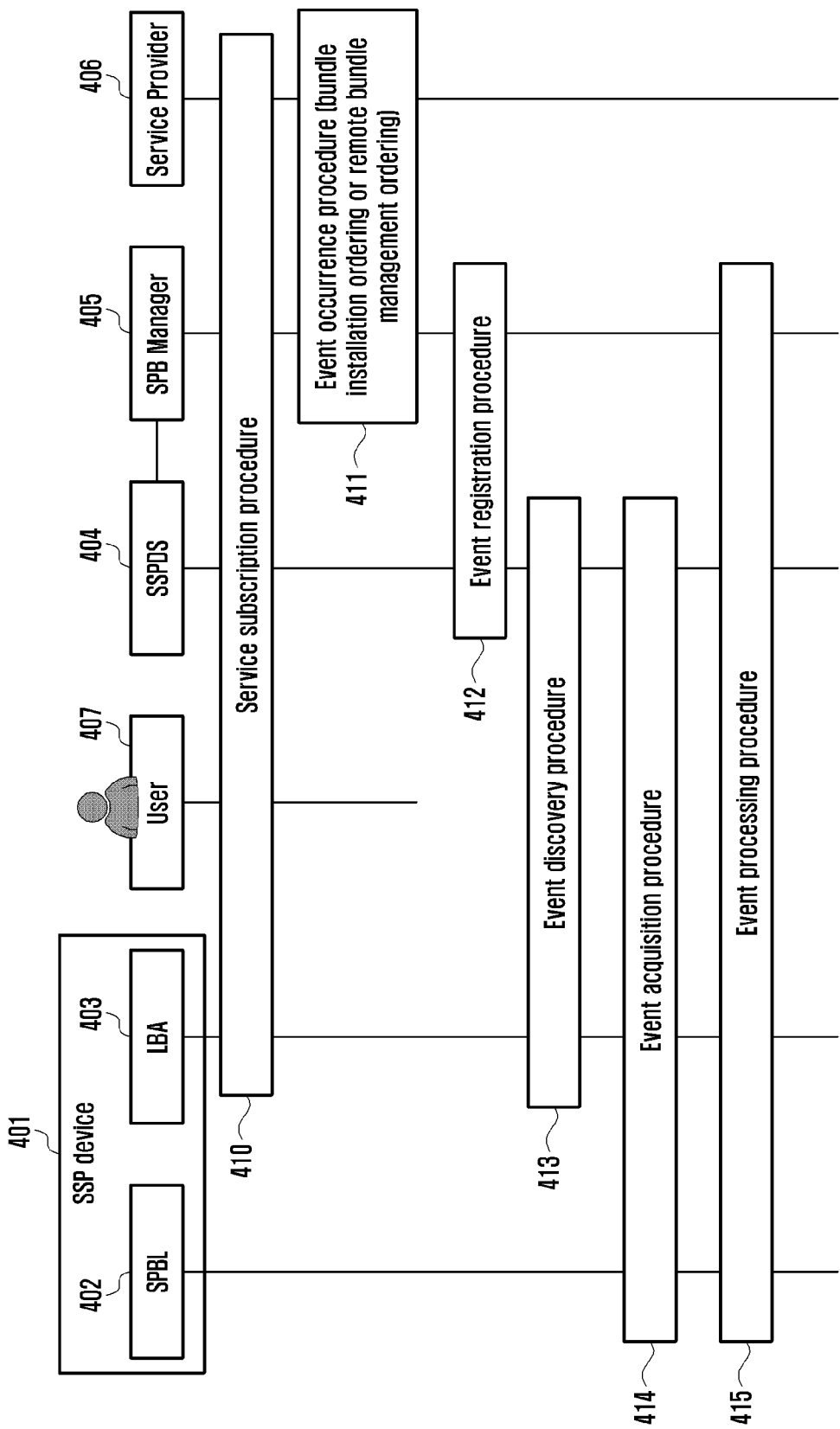
FIG. 4 illustrates a process in which an event to be processed by an SSP terminal occurs, the event is registered in an event-managing server, and the SSP terminal acquires and processes the registered event according to embodiments of the present disclosure.

FIG. 4 illustrates a process in which an event to be processed by an SSP terminal occurs, the event is registered in an event-managing server, and the SSP terminal acquires and processes the registered event according to embodiments of the present disclosure.

A procedure in which an SSP terminal 401 processes an event generated by a service provider 406 includes five procedures. The five procedures are an event occurrence procedure 411, an event registration procedure 412, an event discovery procedure 413, an event acquisition procedure 414, and an event processing procedure 415, and some thereof may be omitted.

In the present embodiment, an SPBL 402, an LBA 403, an SSPDS 404, and an SPB manager 405 may correspond to the SPBL 307, the LBA 306, the SSPDS 304, and the SPB manager 303 in FIG. 3, respectively.

A user 407 and the service provider 406 may perform a service subscription procedure 410 before the event occurrence procedure 411. The service subscription procedure 410 may be performed with reference to the service subscription procedure 310 in FIG. 3.

The event occurrence procedure 411 may be performed with reference to the event occurrence procedure 311 in FIG. 3.

The event registration procedure 412 may be performed with reference to the event registration procedure 312 in FIG. 3.

The event discovery procedure 413 may be performed with reference to the event discovery procedure 313 in FIG. 3.

The event acquisition procedure 414 may be performed with reference to the event acquisition procedure 314 in FIG. 3.

The event processing procedure 415 may be performed with reference to the event processing procedure 315 in FIG. 3.

Figure 5:
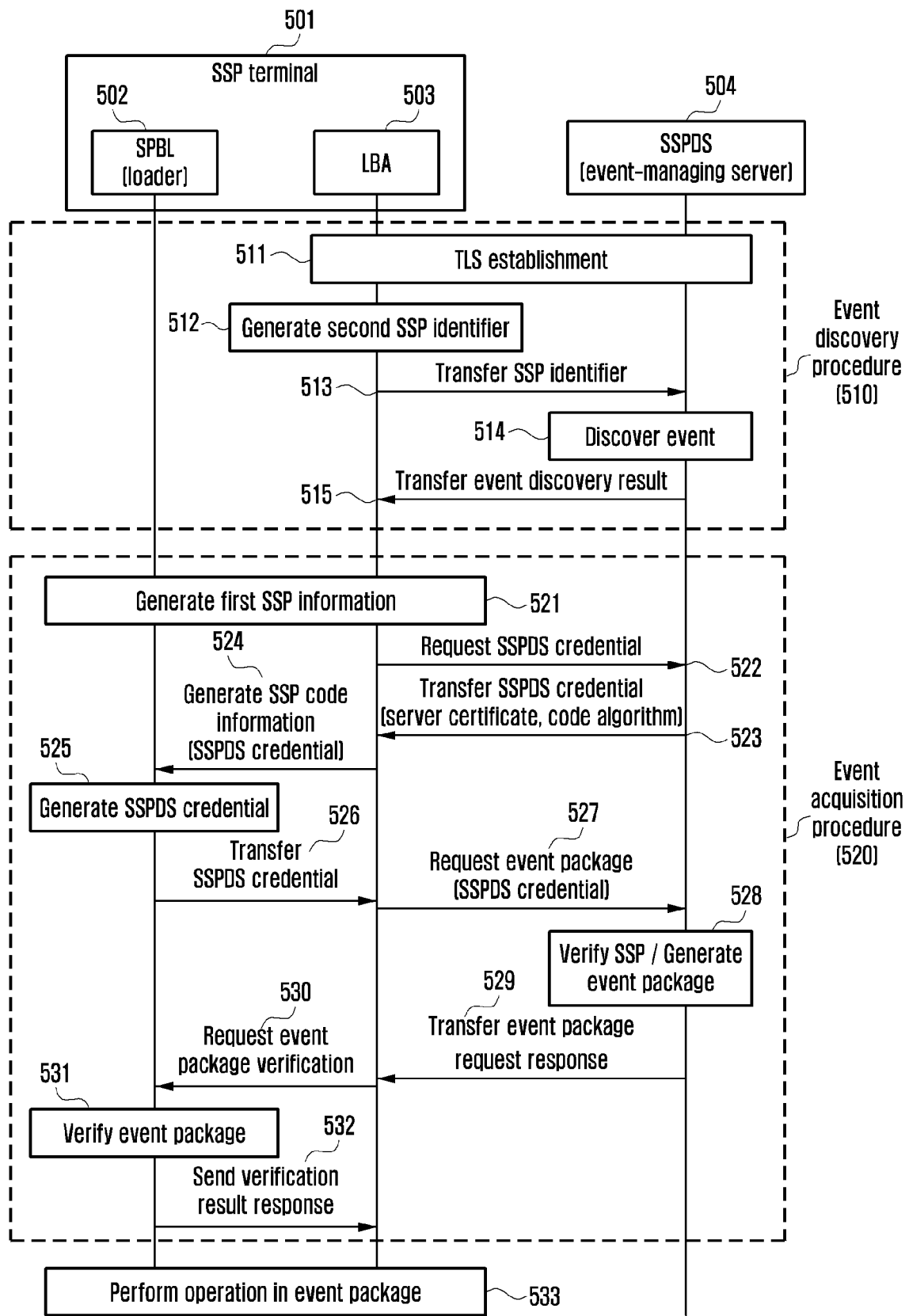
FIG. 5 illustrates an SSP terminal requesting an event-managing server to search for an event and acquiring an event according to embodiments of the present disclosure.

FIG. 5 illustrates an SSP terminal requesting an event-managing server to search for an event and acquires an event according to embodiments of the present disclosure.

An event discovery procedure 510 in FIG. 5 may be an embodiment of the event discovery procedure 413 in FIG. 4. Further, the event discovery procedure 510 may be an embodiment of the event discovery procedure 313 in FIG. 3.

An event acquisition procedure 520 in FIG. 5 may be an embodiment of the event acquisition procedure 414 in FIG. 4. Further, the event acquisition procedure 520 may be an embodiment of the event acquisition procedure 314 in FIG. 3.

The event discovery procedure 510 may include some or all of operations 511, 512, 513, 514, and 515.

In operation 511, an LBA 503 may establish a TLS channel in an SSPDS 504.

In operation 512, the LBA 503 may generate a second SSP identifier. According to some embodiments, the second SSP identifier may be generated using a first SSP identifier of an SSP terminal 501.

The second SSP identifier may be generated as follows.

i. The second SSP identifier may be generated by hashing a first SSP identifier by means of an SHA-1 or SHA-2 hash function. The second SSP identifier may also be generated using a function that is different from the SHA-1 or SHA-2 hash function in the process of generating the second SSP identifier.

ii. The second SSP identifier may be generated by hashing a string, in which a first SSP identifier is combined with information about the SSPDS 504, by means of an SHA-1 or SHA-2 hash function. The second SSP identifier may be generated using a function that is different from the SHA-1 or SHA-2 hash function in the process of generating the second SSP identifier. The information about the SSPDS 504 may be one or more values such as an object identifier, a fully qualified domain name (FQDN), a uniform resource locator (URL), an IP address, or the like of the SSPDS 504, or may be information generated by combining the values in various methods. The information about the SSPDS 504 may be information related to the SSPDS 504, other than the above-described information. The first SSP identifier and the information about the SSPDS 504 may be combined with each other by various methods such as concatenation of strings to be combined (string concatenating) or XOR calculation.

iii. The second SSP identifier may be generated using a function that is different from an SHA-1 or SHA-2 hash function in the process of generating the second SSP identifier. A function input value may be configured by combining pieces of information known to both the SSP terminal 501 and the SSPDS 504. The information may be one or more values such as a first SSP identifier of the SSP terminal 501 and an object identifier, a fully qualified domain name (FQDN), a uniform resource locator (URL), an IP address, or the like of the SSPDS 504, or may be information generated by combining the values in various methods.

In an example of generation of a second SSP identifier, when an SSP terminal, the primary platform identifier of which is "ABCD1234", desires to accesses an SSPDS, the FQDN of which is "WWW.SPBMDS.COM", and request the SSPDS to determine whether there is an event to be performed by the SSP terminal, the SSP terminal may generate the second SSP identifier as follows.

i. Second SSP identifier=SHA-2 (ABCD1234WWW.SPBMDS.COM).

SHA-2 ("string") is a value obtained by hashing "string" by means of an SHA-2 hash function.

In operation 513, the LBA 503 may transfer an SSP identifier to the SSPDS 504 to request the SSDPS 504 to discover an event to be processed by the LBA 503. According to some embodiments, in operation 513, the SSP identifier transferred by the LBA 503 may be a first SSP identifier. According to some embodiments, in operation 513, the SSP identifier transferred by the LBA 503 may be a second SSP identifier. According to some embodiments, in operation 513, the SSP identifier transferred by the LBA 503 may include both the first SSP identifier and the second SSP identifier. In operation 513, the LBA 503 may also transfer additional information, which may be used to search for an event or identify the SSP terminal 501, to the SSPDS 504 together with the SSP identifier.

In operation 514, the SSPDS 504 searches, using the SSP identifier transferred to the LBA 503 in operation 513, for whether there is an event indexed by the SSP identifier among unprocessed events managed by the SSPDS 504. The unprocessed events managed by the SSPDS 504 may be events they have not yet been transferred to the SSP terminal 501 among events registered from a service provider's server or an SPB manager, which is under contract with the SSPDS 504. Further, the operation of searching for an event indexed by the SSP identifier may be an operation of searching for an event to be processed in an SSP having the SSP identifier among events registered in the SSPDS 504, or a procedure of searching for an event including an SSP identifier among events managed in the SSPDS 504. In addition, in operation 514, the SSPDS 504 may search for an unprocessed event, which is to be processed by the SSP terminal 501, by using the information transferred from the LBA 503.

In operation 515, the SSPDS 504 may transfer an event discovery result to the LBA 503. The event discovery result may include the following items.
   i. Whether there is an event to be processed by an SPBL 502 of the SSP terminal 501.
   ii. The number of events to be processed by the SPBL 502 of the SSP terminal 501.

In FIG. 5, the SPBL 502, which is a system bundle of the SSP, is a component configured to substantially perform bundle management in conjunction with the LBA 503. Therefore, in FIG. 5, the SSP may be interchangeably used with the SPBL.

The event acquisition procedure 520 may include some or all of operations 521 to 531.

The LBA 503 may perform the event acquisition procedure 520 without performing the event discovery procedure 510. Further, after performing the event discovery procedure 510, when the event discovery result received in operation 515 indicates that there is an event to be processed by the SSP of the SSP terminal 501, the LBA 503 may perform the event acquisition procedure 520.

In operation 521, the LBA 503 may request the SPBL 502 to generate first SSP information. Operation 521 may include a procedure in which the LBA 503 requests the SPBL 502 to generate the first SSP information, a procedure in which the SPBL 502 generates the first SSP information, and a procedure of transferring the generated first SSP information to the LBA 503. In operation 521, the LBA 503 may store first SSP information previously received from the SPBL 502, and may reuse the stored first SSP information.

In operation 522, the LBA 503 may request an SSPDS credential from the SSPDS 504. In operation 522, the LBA 503 and the SSPDS 504 may establish a TLS session. In operation 522, the LBA 503 may transfer the following types of information to the SSPDS 504 to request an SSPDS credential.
   i. First SSP information generated by the SPBL 502 in operation 521. The first SSP information may be used to select a key formation certificate that is to be used by the SSPDS 504. The first SSP information indicates a CI public key identifier indicating a signature certificate to be used by the SPBL 502, and may be used to respond to the SPBL 502. The first SSP information may be used when the SSPDS 504 selects an encryption algorithm that the SPBL 502 uses to generate SSP encryption information in operation 525. The first SSP information may include specification version information (specification version number) of the SSP, which is used to implement the SPBL.
   ii. SSP terminal information. The SSP terminal information may include an LBA configuration value or LBA specification version information (specification version number).

In operation 523, the SSPDS 504 may generate an SSPDS credential on the basis of the information transferred by the LBA 503 in operation 522, and may transfer the generated SSPDS credential to the LBA 503. The SSPDS credential may include some or all of the following items.
   i. An SSPDS key formation certificate. The SSPDS key formation certificate may be used to form a session key used for encryption when the SPBL 502 generates SSP encryption information in operation 525.
   ii. A certificate chain for verifying the SSPDS key formation certificate.
   iii. An SSPDS signature certificate and a certificate chain for verifying the SSPDS signature certificate.
   iv. A CI public key identifier usable to select a signature certificate to be used by the SPBL 502.
   v. An algorithm identifier usable to select an encryption algorithm to be used by the SPBL 502.

In operation 524, the LBA 503 may request an SSP DS credential from the SPBL 502. In operation 524, the LBA 503 may transfer an SSPDS server certificate received in operation 523 to the SPBL 502.

In operation 525, the SPBL 502 may perform some or all of the following processes to generate the SSP DS credential.
   i. Verifying a certificate by using a certification chain and an SSPDS key certificate (CERT.SPBMDS.KA) included in the SSPDS credential received in operation 524.
   ii. Selecting an SPBL signature certificate (CERT.SPBL.DS). The selection of an SPBL signature certificate may be performed based on information included in the SSPDS credential.
   iii. Generating an SPBL ephemeral key pair. A public key of a generated SPBL ephemeral key pair may be expressed as "ePK.SPBL.KA", and a private key thereof may be expressed as "eSK.SPBL.KA".
   iv. Generating ID_TRANSAC usable as a session ID.
   v. Generating a first session key (session key 1) by using the public key (PK.SPBMDS.KA) included in an SSPDS key generation certificate and a private key (eSK.SPBL.KA) of the SPBL ephemeral key.
   vi. Generating sspImageSessionToken including an SPBL ephemeral key and generating sspImageSessionToken-Signature in which the sspImageSessionToken is signed by a private key (SK.SPBL.DS) corresponding to an SPBL signature certificate (CERT. SPBL.DS).
   vii. Generating second SSP information. The second SSP information may be information including a configuration value of an SSP for an SSP DS.
   viii. Generating sspToken including the generated second SSP information and generating sspTokenSignature in which the sspToken is signed by a private key corresponding to the SPBL signature certificate (CERT.SPBL.DS).
   ix. Encrypting the SPBL signature certificate (CERT.SPBL.DS), the SspToken, and the SspTokenSignature by using the generated first session key to generate a first encrypted information (M-SSP) and first integrity check information (H-SSP). The generated SspToken and SspTokenSignature may be encrypted separately from the SPBL signature certificate so as to generate second encrypted information (M-SSP2) and second integrity check information (M-SSP2).
   x. SSP DS credential generation: Generating an SSP DS credential including: a certificate chain that the SPB manager uses to verity the SPBL signature certificate; the generated sspImageSessionToken; the generated sspImageSessionTokenSignature; the generated sspToken; the generated sspTokenSignature; the generated first encrypted (M-SSP); and the generated first integrity check information (H-SSP). The SSP DS credential may include the generated second encrypted information (M-SSP2) and the generated second integrated check information (H-SSP2).

In operation 526, the SPBL 502 may transfer the SSP DS credential generated in operation 525 to the LBA 503. Operation 526 may be a response to the request that the LBA 503 made to the SPBL 502 for the SSP DS credential in operation 524.

In operation 527, the LBA 503 may request an event package from the SSPDS 504. In operation 527, the LBA 503 may transfer some or all of the following items to the SSPDS 504.
  i. The SSP DS credential received from the SPBL 502 in operation 526.
  ii. SSP terminal information.

In operation 528, when an event package request message is received from the LBA 503, the SSPDS 504 may perform some or all of the following operations. 1) Verifying the SSP DS credential transferred through the event package request message. 2) Generating a response message that is to be sent to an identified SSP terminal in response to the event package request.

A method for verifying the SSP DS credential may include some or all of the following operations.
  i. Generating a first session key (session key 1) by using a private key (SK.SPBMDS.KA) for SSPDS key formation and a public key (ePK.SPBL.KA) of an SPBL ephemeral key included in the SSP DS credential received in operation 527. The private key (SK.SPBMDS.KA) for SSPDS key formation is a private key that forms a pair with the public key (PK.SPBMDS.KA) of the SSPDS key generation certificate that has been selected and transferred to the LBA 503 in operation 523.
  ii. M-SSP decryption using the first session key.
  iii. Verifying an SPBL signature certificate (CERT.SPBL.DS) obtained by the M-SSP decryption. The SPBL signature certificate verification may be performed using an SPBL certificate chain included in the SSP credential. Further, the SPBL signature certificate verification may be performed using one piece of CI information of the signature certificate which is transmitted in operation 522 and is to be used by the SSP.
  iv. Verifying, using an SPBL certificate, sspToken obtained through the M-SSP decryption and sspTokenSignature that corresponds to the signature thereof
  v. Verifying, using the SPBL certificate, sspImageSessionToken and sspImageSessionTokenSignature that corresponds to the signature thereof
  vi. Storing an ID_TRANSAC value included in sspImageSessionToken.

After the SSP DS credential verification is successfully performed, the SSPDS 504 may generate a response message in response to the event package request. The response message generated in response to the event package request may be called an event package request response message. In the procedure of generating the event package request response message, some or all of the following operations may be performed.
  i. Calling a session corresponding to a transaction ID (ID_TRANSAC) if the transaction ID (ID_TRANSAC) is included in the SSP DS credential received in operation 527.
  ii. Selecting, based on information managed in the session, an SSPDS signature certificate (CERT.SPBMDS.DS) and a certificate chain usable to verify the same.
  iii. Extracting an SSP identifier from information included in the SSP DS credential received in operation 527.
  iv. Extracting an event record, which includes the SSP identifier or is indexed by the SSP identifier, from among event records managed by the SSPDS 504. The process of extracting event records may be a process of classifying event records that are to be processed by an SSP identified by an SSP identifier.
  v. Generating an event package by packaging the extracted event records.
  vi. Signing the generated event package by a private key corresponding to a public key of an SSPDS signature certificate to generate an event package signature.
  vii. Including the generated event package in the event package request response message.
  viii. Including the generated event package signature in the event package request response message.
  ix. Including the selected SSPDS signature certificate (CERT.SPBMDS.DS) and certificate chain in the event package request response message.
  x. Including the transaction ID (ID_TRANSAC), which is included in the SSP DS credential received in operation 527, in event package request response message.

In operation 528, when there is no event record which includes an SSP identifier or is indexed by the SSP identifier, the event package request response message may be generated as only a message to notify the LBA 503 of the absence of an event to be performed.

In operation 529, the SSPDS 504 may transfer the event package request response message generated in operation 528 to the LBA 503.

In operation 530, the LBA 503 may transfer, to the SPBL 502, the event package request response message received in operation 529, and may request the SPBL 502 to verify the response message.

In operation 531, the SPBL 502 may verify the event package request response message received from LBA 503 in operation 530. The response message verification in operation 531 may include some or all of the following operations.
  i. Verifying a signature certificate of the SSPDS 504, included in the response message. This operation may be a procedure of verifying the SSPDS signature certificate (CERT.SPBMDS.DS) and the certificate chain.
  ii. Verifying a signature included in the response message. This verification may be performed through a public key in the verified SSPDS certificate.
  iii. Verifying whether an SSP identifier, which is included in each event record of an event package included in the response message, is one of SSP identifiers configured in the SPBL. The SSP identifier configured in the SPBL may be a first SSP identifier or a second SSP identifier.

In operation 532, the SPBL 502 may transfer the result of the event package verification performed in operation 531 to the LBA 503. The result of the event package verification may be transferred in the form of one of error codes distinguishing between grounds for success or failure in verification.

In operation 533, the LBA 503 may process an event by using information in the event package received in operation 529. The event processing may be one of the following operations.

i. Requesting bundle download and remote bundle management commands from a bundle-managing server (SPB manager) by using a bundle-managing server address included in the event package.
ii. Requesting bundle download from a bundle-managing server (SPB manager) by using a code matching identifier (CodeM) or a bundle-managing server address and an event identifier included in the event package.
iii. Requesting a remote management command or a remote management package from a bundle-managing server (SPB manager) by using a code matching identifier (CodeM) or a bundle-managing server address and an event identifier included in the event package.
iv. Requesting, from a bundle-managing server (SPB manager), a remote management command or a remote management package for a particular bundle identified through a bundle identifier, by using a code matching identifier (CodeM) and a bundle identifier or a bundle-managing server address and an event identifier included in the event package.

The embodiment in FIG. 5 may be similarly applied to an eSIM terminal including an eUICC. In this case, the SSP terminal 501 may correspond to the eSIM terminal, the SPBL 502 may correspond to the eUICC or ISD-R, the LBA 503 may correspond to an LPA, and the event-managing server 504 may correspond to an SM-DS. Further, the process of generating the second SSP identifier in operation 512 may be a process of generating the second SSP identifier by using an eID, which is an identifier of the eUICC, instead of the first SSP identifier. Further, operations 521 to 532 corresponding to the event acquisition procedure 520 may correspond to a process in which the eUICC and the SM-DS authenticate each other on the basis of digital certificates in the GSMA SGP.22 standard procedure and acquire an event.

Figure 6:
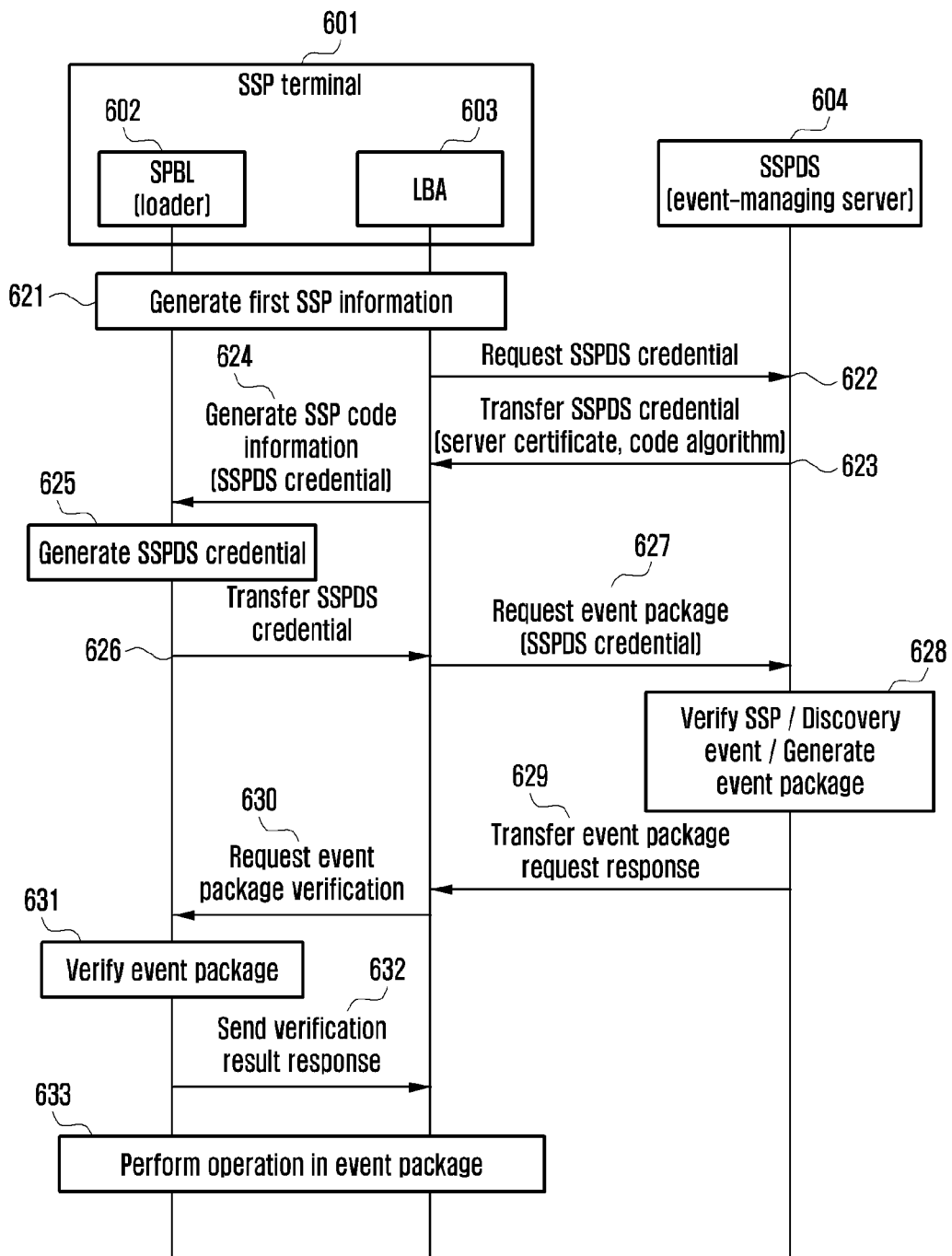
FIG. 6 illustrates another SSP terminal requesting an event-managing server (SSPDS) to search for an event and acquiring an event according to embodiments of the present disclosure.

FIG. 6 illustrates another process for an SSP terminal requesting an event-managing server (SSPDS) to search for an event and acquiring an event according to embodiments of the present disclosure.

FIG. 6 may be a specific embodiment of performing the event acquisition procedure 414 without performing the event discovery procedure 413 in FIG. 4.

Operations 621 to 633 in FIG. 6 may be performed in the same manner as operations 521 to 533 in FIG. 5.

When an event package request response message transferred from an SSPDS 604 in operation 629 indicates that there is no event to be performed, the LBA 603 may end the procedure without performing operations following operation 630.

Figure 7:
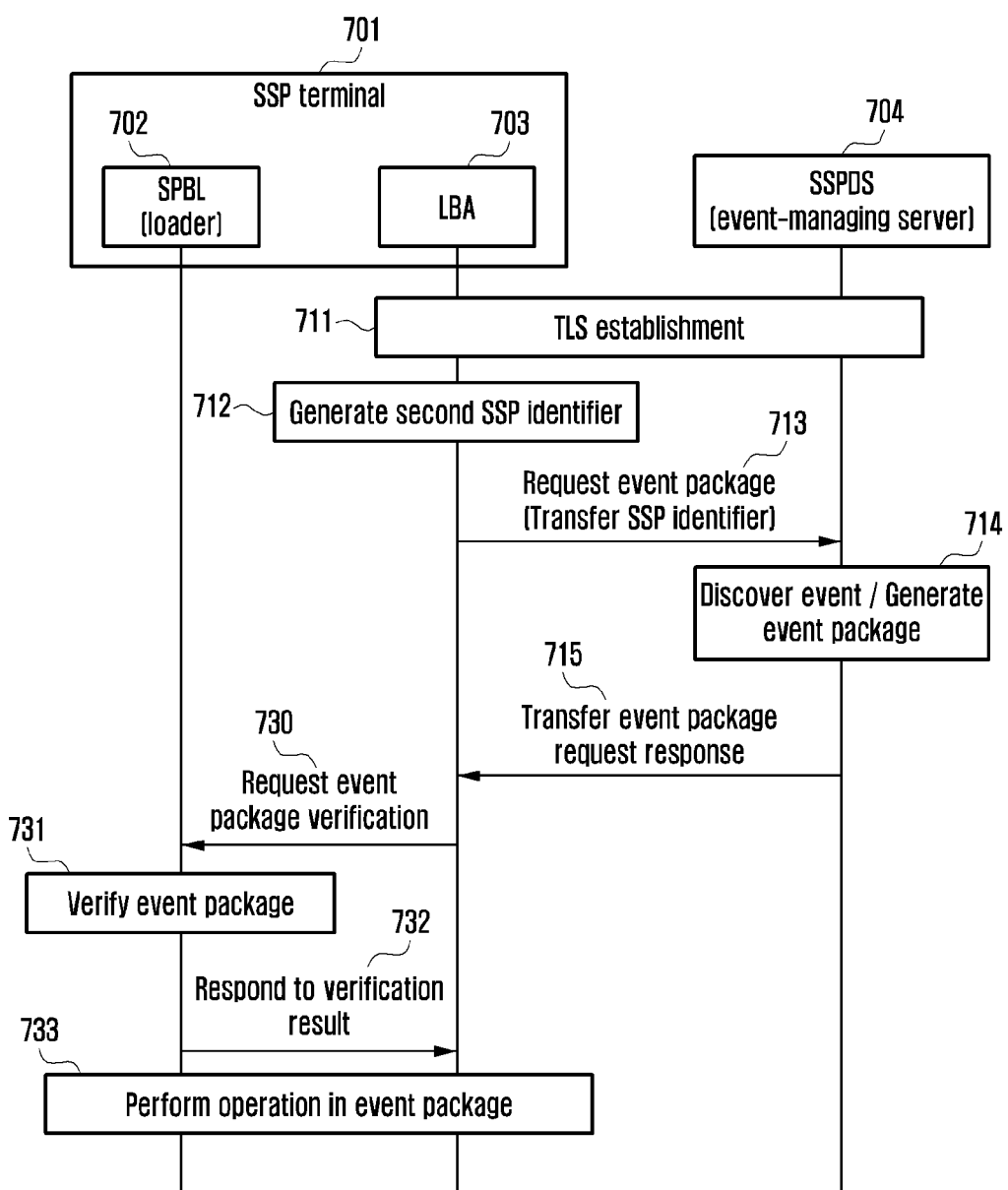
FIG. 7 illustrates another process for an SSP terminal requesting an event-managing server (SSPDS) to search for an event and acquiring an event according to embodiments of the present disclosure.

FIG. 7 illustrates another process for an SSP terminal requesting an event-managing server (SSPDS) to search for an event and acquiring an event according to embodiments of the present disclosure.

FIG. 7 is an embodiment in which an SSP terminal 701 receives and processes a response including an event package from a server in response to the event discovery procedure 413 in FIG. 4.

Operations 711, 712, and 713 in FIG. 7 may be performed with reference to operations 511, 512, and 513 in FIG. 5. Operation 713 may be a procedure in which an LBA 703 requests an event package by transferring an SSP identifier to an event-managing server 704.

In operation 714 in FIG. 7, the event-managing server 704 identifies an SSP terminal through the SSP identifier received in operation 713 and searches for an event that is matched to or indexed by the received SSP identifier. When there is an event matched to or indexed by the received SSP identifier, the event-managing server 704 generates an event package. In relation to a process of generating the event package, reference may be made to a part of the event package request response message generation procedure in operation 528.

In operation 715, the event-managing server 704 may transfer an event package request response to an LBA 703.

Operations 730, 731, 732, and 733 may be performed with reference to operations 530, 531, 532, and 533 in FIG. 5.

The embodiment in FIG. 7 may also be similarly applied to an eSIM terminal including an eUICC. In this case, the SSP terminal 701 may correspond to an eSIM terminal, an SPBL 702 may correspond to an eUICC or ISD-R, the LBA 703 may correspond to an LPA, and the event-managing server 704 may correspond to an SM-DS. Further, the process of generating a second SSP identifier in operation 712 may be a process of generating the second SSP identifier by using an eID, which is an identifier of the eUICC, instead of a first SSP identifier, together with an SM-DS address. Further, operations 730, 731, 732, and 733 may correspond to a process in which the eUICC defined in the GSMA SGP.22 standard verifies an event, a certificate, and a signature, which are sent by a server.

FIG. 8 illustrates an event discovery configuration in a terminal according to embodiments of the present disclosure.

The terminal may be an SSP terminal. Reference numeral 801 is an example showing values related to an event discovery configuration in the terminal in the form of a table. The event discovery configuration may be a configuration related to information about an event-managing server that the terminal is to access in order to perform an event discovery procedure and an event acquisition procedure. The information about the event-managing server may be classified and configured based on various elements. The values shown in reference numeral 801 may be configured and stored in an LBA or SPBL of the terminal. According to some embodiments, reference numeral 801 may be configured in an SPBL that is a system bundle of an SSP, and a terminal software LBA may read and use values corresponding to reference numeral 801 from the SPBL.

Each value in column 802 may be an address of the event-managing server. Each value in column 802 may be information including a value (e.g., FQDN, IP address, or port number) related to a server address which the LBA is to use to access the event-managing server.

Further, each value in column 802 may be related to a corresponding value in each of columns 803, 804, 805, 806, and 807 which are present in the same row. In a specific example, a value (www.spbmDs-example1.com) of reference numeral 822 may indicate an address of an event-managing server, which the LAB is to use when a family identifier is Telecom ID 823, a CID is GSMA_ID 824, and an event acquisition method is Polling 826. According to the example of reference numeral 801, each value in column 803 may indicate a family identifier, each value in column 804 may indicate a CID, column 805 may indicate a bundle identifier, and column 806 may indicate an event management method. The content of the event discovery configuration table 801 may be extended by adding other elements, in addition to the family identifier, the CID, the bundle identifier, and the event acquisition method, which are described above.

Values included in row 811 may be values configured by a terminal manufacturer when an SSP terminal is manufactured. Values of columns 802, 803, 804, 805, 806, and 807 in row 811 may be values based on a manufacturer's preference or a particular operator's preference when a terminal is manufactured for the particular operator.

Likewise, values included in row 812 may correspond to values configured by a service provider after a bundle is installed in an SSP. The value configured by the service provider may be an address of an event-managing server which the LBA is to access in order to receive, in the process of installing a bundle in the SSP, commands for remotely managing the bundle later. In a specific example, a value (www.spbmDS-example6.com) of reference numeral 832 may be an address of an event-managing server that the LBA is to access in order to search for and acquire an event for processing a particular bundle which is BundleID_1 835.

FIG. 9 illustrates a process for transferring an event discovery configuration of a terminal to a service provider according to embodiments of the present disclosure.

FIG. 9 may correspond to some embodiments in which a user 904 transfers an event discovery configuration of a terminal to a service provider 907 during service subscription. Further, FIG. 9 may correspond to a part of a specific embodiment of the service subscription procedure 310 in FIG. 3 or the service subscription procedure 410 in FIG. 4.

In relation to the event discovery configuration, reference may be made to FIG. 8.

The user 904 may visit a store of the service provider 907, and may transfer an event discovery configuration of an SSP terminal to a server of the service provider 907 through a store employee 906. Further, the user may transfer the event discovery configuration through a webpage 906 linked with the server of the service provider 907. For convenience's sake, all of the service provider 907, the store employee, and the webpage 906 may be referred to as reference numeral 905.

According to FIG. 9, an SSP terminal 901 may transfer an event discovery configuration according to operations 911, 912, and 913, or may transfer the event discovery configuration according to operation 921.

The process of transferring an event discovery configuration of a terminal to the service provider 907 according to operations 911, 912, and 913 may be a process using an SSP terminal.

Operation 911 may be a process in which the user 904 operates the SSP terminal 901 to call an event discovery configuration of the SSP terminal through menu items of an LBA 903. Operation 911 may be performed through various applications of the SSP terminal 901. In a specific example, operation 911 may be performed through a basic configuration menu of a terminal OS, a manufacturer configuration application menu, a mobile operator application menu, or a configuration menu of an application providing a service through an SSP.

Operation 912 is an operation in which, when the user drives a particular application in operation 911, the application forms information to be transferred to the server. In operation 912, an event discovery configuration value of the SSP terminal may be encoded and output on a screen in the form of a QR. The result output in operation 912 may depend upon an application selected by the user in operation 911. In a specific example, when an event discovery configuration is called from a telecom configuration menu of the SSP terminal 901, an event discovery configuration result in which a family identifier is limited to a telecom identifier may be encoded in the form of a QR code and may be output on a screen. Further, information encoded in the form of a QR code in operation 912 may additionally include an SSP identifier of the terminal. The SSP identifier of the terminal is a primary platform identifier which is a first SSP identifier. The SSP identifier may be used in the process in which the service provider 907 binds a bundle to be installed in only a particular SSP.

In some specific embodiments of operation 912, a QR code may be formed as follows.

i. Forming a primary platform identifier of a terminal and an event discovery configuration value of the terminal as one concatenated string. The event discovery configuration value of the terminal may be a string encoded in the form of a tag length value (TLV). The configuration values in table 801 of FIG. 8 may be continuously included in the event discovery configuration value of the terminal, which is encoded in the form of a TLV.

In operation 913, the event discovery configuration information of the terminal that has been formed in operation 912 may be transferred to the service provider 907. Operation 913 may be a process of scanning the QR code formed in operation 912.

Operation 921 may be a process of transferring the event discovery configuration of the SSP terminal to the service provider 907 through a QR code or a bar code attached to a product box of the SSP terminal. Information included in the QR code or bar code attached to the product box may be the same as the information generated in operation 912 or may be some filtered pieces of the information generated in operation 912.

Figure 10:
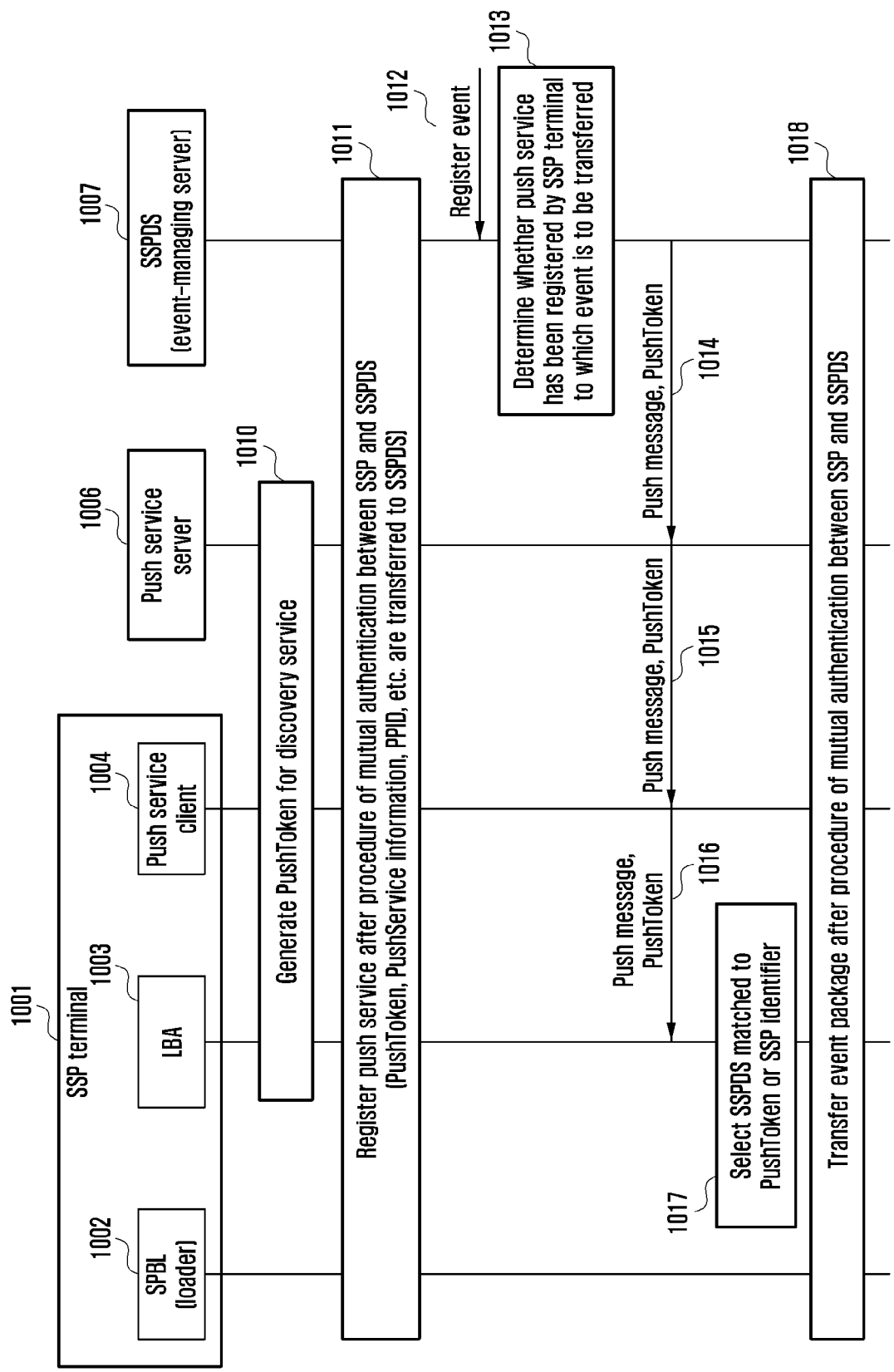
FIG. 10 illustrates transferring an event registered in an event-managing server to an SSP terminal through a push message according to embodiments of the present disclosure.

FIG. 10 illustrates transferring an event registered in an event-managing server to an SSP terminal through a push message according to embodiments of the present disclosure.

When an event is registered from a service provider or a bundle-managing server (SPB manager), the event-managing server may notify, through a push message, the SSP terminal that the event has been registered. This is called a push-based event notification function.

Referring to FIG. 10, an SSP terminal 1001 may include push service client software 1004 capable of supporting a push service. The push service client 1004 may be software supported at a framework in an operating system (e.g., ANDROID, iOS, WINDOWS, etc.) of the terminal. The push service client 1004 may be used in conjunction with a notification system such as a GOOGLE CLOUD MESSAGING (GCM), FIREBASE CLOUD MESSAGING (FCM), APPLE PUSH NOTIFICATION SERVICE (APNS), AZURE NOTIFICATION HUBS, or WINDOW NOTIFICATION SERVICE (WNS).

The push service client 1004 of the terminal may be linked with a push service server 1006, and a push message may be transferred from an event-managing server 1007 to an LBA 1003.

First, the LBA 1003 should be registered in the push service client 1004 in order to receive a push service. A method for registering the LBA 1003 in the push service client 1004 may be a method in which the LBA 1003 is issued with a push token by using an API which is provided by the push service client 1004. The push token may be used to uniquely identify a particular application (e.g., the LBA 1003 in the present embodiment) among multiple applications registered in the push service client 1004.

Figure 12:
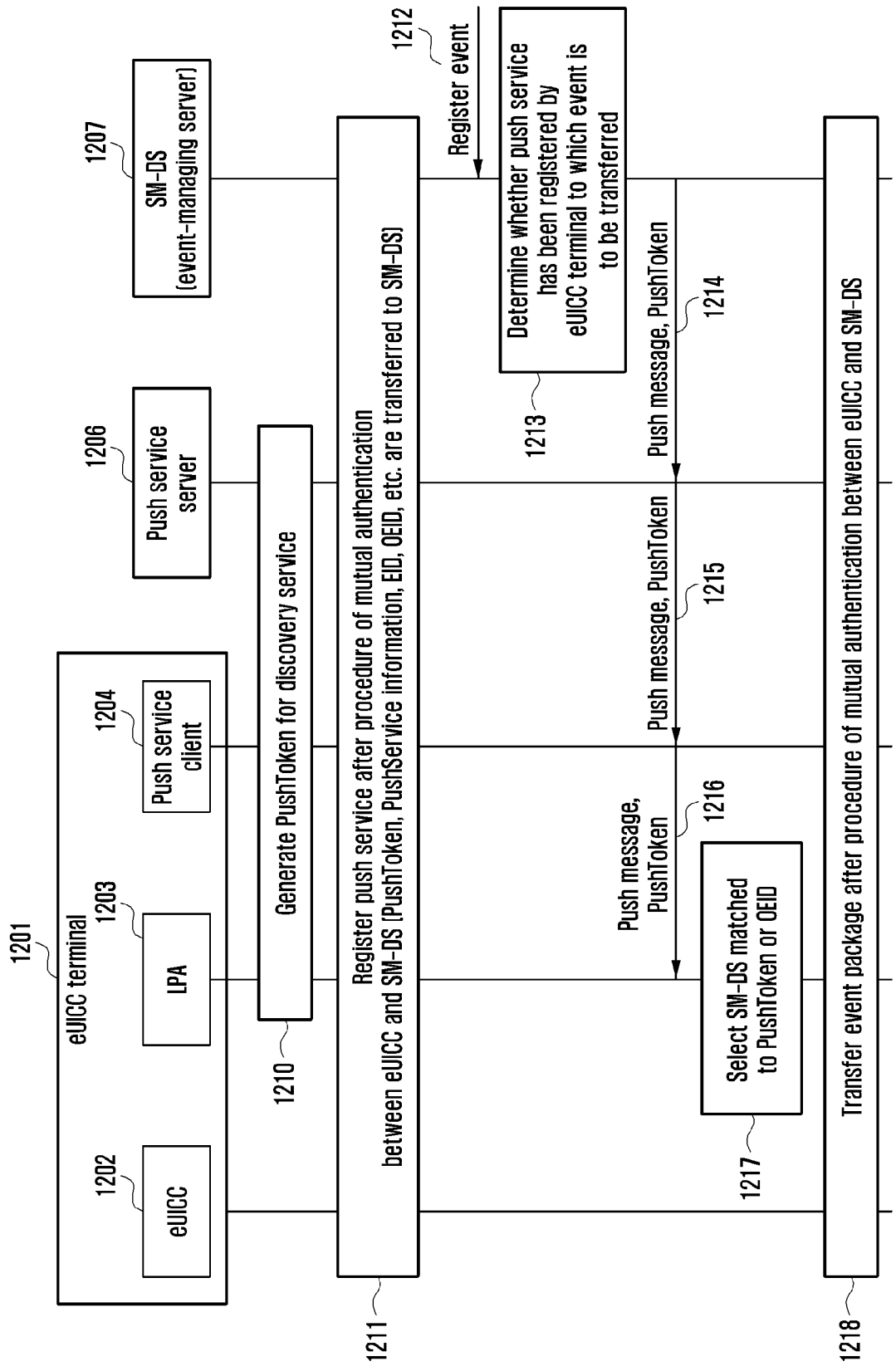
FIG. 12 illustrates a process in which an eUICC terminal and an SM-DS register a push service according to embodiments of the present disclosure.

The LBA 1003 registers for a push service in conjunction with the push service client 1004 in the terminal 1001. In this process, the LBA may be registered as an instance in the push service client, and may be issued with a push token in operation 1010. Meanwhile, as illustrated in FIG. 12, a push service client 1204 may also transfer application information of an LPA 1203 (e.g., a hash value of an application, an application identifier, etc.) to a push service server 1206 to cause the LPA 1203 to register for the push service. In order to register a push service in multiple event-managing servers 1007, the LBA 1003 may be issued with multiple push tokens from the push service client 1004, and may classify the push tokens according to the event-managing servers to register the push service in each of the event-managing server. Further, the LBA 1003 may use an identical push token to register a push service in multiple event-managing servers 1007. In order to register a push service in the multiple event-managing servers 1007 by using the identical push token, the LBA 1003 may transfer side information for identifying the event-managing server 1007 to the event-managing server 1007 in push service registration operation 1011. The side information may be a second SSP identifier.

When being issued with a push token, the SSP terminal 1001 transfers the push token to the event-managing server 1007 that is to use a push service by using the push token in operation 1011. When the SSP terminal 1001 transfers the push token, the following types of information may be included such that the event-managing server 1007 can register the push service at the server side.

i. Information about a push service registered by the SSP terminal (e.g., GCM, FCM, APNS, WNS, or names of other private push services, or an address or name of a push server)
    ii. Push token.
    iii. First SSP identifier.
    iv. Second SSP identifier.
    v. Second SSP information. The second SSP information may include an encrypted SPBL certificate and a temporary key capable of forming a session key.

The event-managing server 1007 having received the above-described information manages an SSP identifier (a first SSP identifier or a second SSP identifier) while linking the SSP identifier with a push token. The event-managing server 1007 may register a push service in conjunction with the push service server 1006. When an event is registered in the event-managing server 1007 after the push service is registered, the event-managing server 1007 determines a first SSP identifier or a second SSP identifier of the SSP terminal 1001 which is to receive the event, generates a push message by using the push token linked with the corresponding SSP identifier, and transmits the push message to the push service server.

When an event is registered in the event-managing server 1007 by a service provider or a bundle-managing server in operation 1012, the event-managing server 1007 may determine whether the SSP terminal 1001, which is to receive the event, has registered a push service in operation 1013. Operation 1013 may be a procedure of determining whether the SSP terminal, to which the event registered in the event-managing server 1007 is to be transferred, has registered the push service according to operation 1011. At the time of event registration, an identifier of the SSP terminal 1001, which is to receive the event, is also transmitted, and thus whether the SSP terminal 1001 supports the push service may be determined using the identifier of the SSP terminal.

When the SSP terminal 1001, which is to receive the event registered in operation 1012, registers the push service, the event-managing server 1007 generates a push message and transfers the message to the push service server 1006 in operation 1014. In the push message generation process, the event-managing server 1007 may generate a push message including a push token corresponding to the SSP terminal 1001 to which the event is to be sent. The push token may be used when the push service server 1006 identifies the push service client 1004 to which the push message is to be sent. In the push message generation process, a push message further including an SSP identifier may be generated. The SSP identifier may be used when the SSP terminal identifies the event-managing server 1007 from which the push message is sent. Particularly, when a second SSP identifier is generated using information about the event-managing server 1007 and when the second SSP identifier is included in the push message, the LBA 1003 may identify the event-managing server 1007, which has sent the push message, through the second SSP identifier included in the push message. Further, when the push message includes an address (e.g., FQDN, IP address, etc.) of the event-managing server 1007 or an object identifier (OID) of the event-managing server 1007, the LBA 1003 may identify the event-managing server 1007, which has sent the push message, through the address (e.g., FQDN, IP address, etc.) of the event-managing server 1007 or the object identifier (OID) of the event-managing server 1007, included in the push message.

The push service server 1006 transfers the generated push message to the push service client 1004 which is to receive the push message according to a push token included in the push message in operation 1015.

The push service client 1004 transfers the push message to software in the terminal, linked with the push token included in the push message in operation 1016. In the present embodiment, the software in the terminal is the LBA 1003.

The LBA 1003 having received the push message searches for an event-managing server address matched to the push token included in the push message operation 1017, and makes an event package transfer request after a procedure of mutual authentication with the event-managing server 1007 corresponding to the address in operation 1018. If the push message includes an SSP identifier, the event-managing server address may also be discovered by using the SSP identifier. The event package transfer request may be performed with reference to one among operation 414 in FIG. 4, the event acquisition procedure 520 in FIG. 5, and the embodiments in FIGS. 6 and 7.

Figure 11:
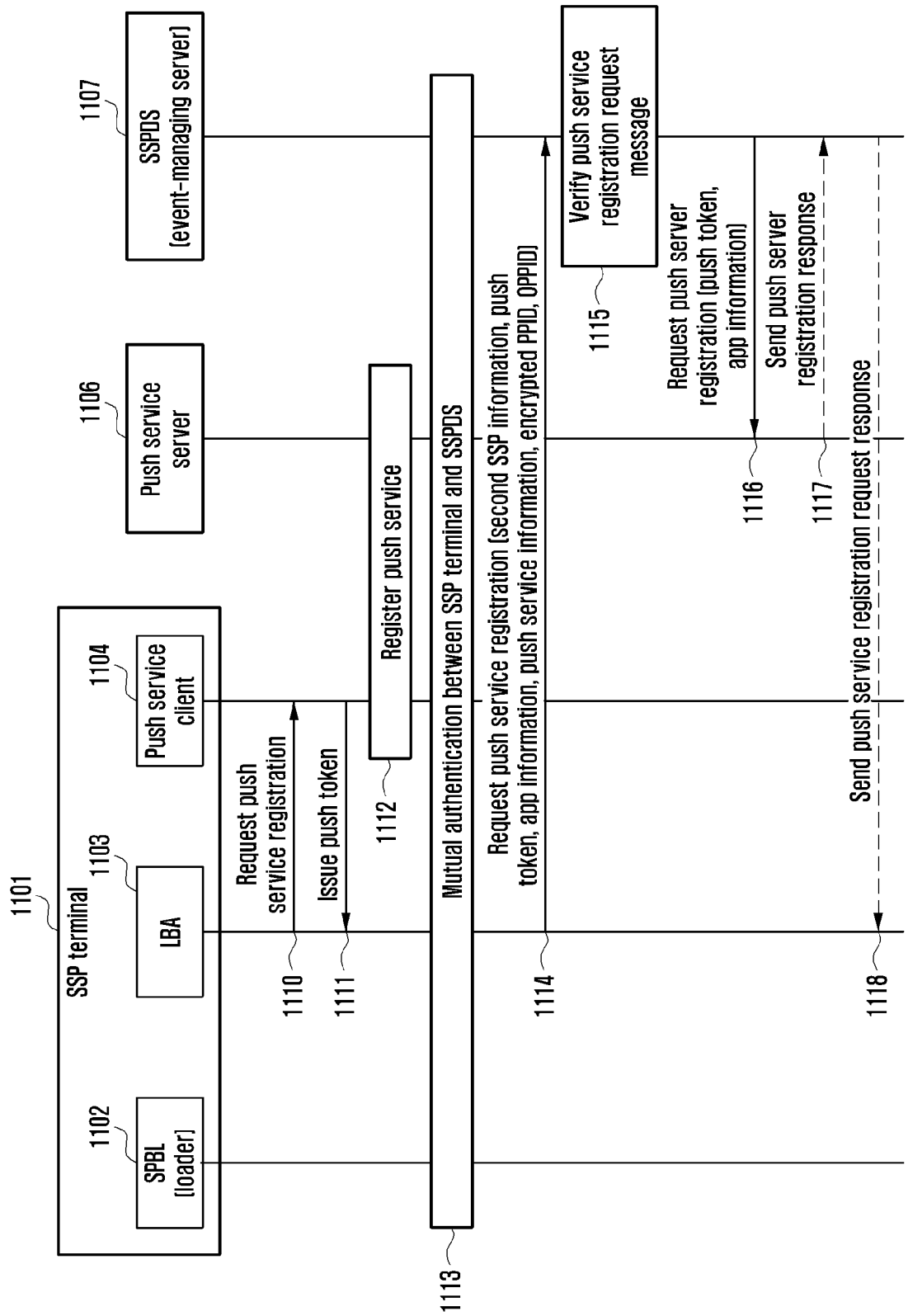
FIG. 11 illustrates an SSP terminal and an event-managing server registering a push service according to embodiments of the present disclosure.

FIG. 11 illustrates an SSP terminal and an event-managing server registering a push service according to embodiments of the present disclosure.

An address of an event-managing server 1107, to which a push service is desired to be connected, and information on whether the push service is supported may be stored in an LBA 1103 of an SSP terminal 1101, or may be collected from SSP metadata or the like and may be stored in an SPBL 1102. Although not illustrated, through information about the event-managing server 1107, stored in the LBA 1103 or the SPBL 1102, the SSP terminal 1101 may determine whether connection of the push service to the event-managing server 1107 is possible.

In operation 1110, the LBA 1103 of the SSP terminal 1101 requests a push service client 1104 to register a push service. When requesting the push service registration, the LBA 1103 may transfer application information thereof to the push service client 1104. The application information of the LBA, which the LBA 1103 transfers to the push service client 1104, may include a hash value of an LBA application, a package name thereof, etc. When requesting the push service registration, the LBA 1103 may additionally transfer an SSP identifier to the push service client 1104. Although not illustrated, the LBA 1103 may read a first SSP identifier from the SPBL 1102, and may combine the first SSP identifier with an address of the event-managing server 1107 to generate a second SSP identifier. The address of the event-managing server 1107 may be a full qualified domain name (FQDN) or a full uniform resource locator (full URL), or an IP address of the event-managing server 1107.

In operation 1111, the push service client 1104 issues a push token to the LBA 1103. The push service client 1104 matches the issued push token to the application information of the LBA.

Before a push token is issued in operation 1111, the push service client 1104 may also transfer the application information of the LBA and the push token to a push service server 1106 to register a push service. According to some embodiments, a push token may also be generated by the push service server 1106. In this case, the push service client 1104 may generate a push service with the push service server 1106, and the push service server 1106 may generate a push token after the generation of the push service and may then transfer the push token to the push service client 1104. The push service client 1104 transfers the push token to the LBA 1103. If a push token is generated by the push service server 1106, operation 1112 may be omitted.

In operation 1112, the push service client 1104 registers the push service in the push service server 1106 by using the same push token as transferred to the LBA 1103. In operation 1112, the push service client 1104 may transfer at least one of the application information of the LBA and the SSP identifier to the push service server 1106. For security, it is recommended that a second SSP identifier is used as the SSP identifier.

According to some embodiments, the sequence of operations 1111 and 1112 may be changed. In this case, a push token may be generated by the push service client 1104 and may be transferred to the push service server 1106, or may be generated by the push service server 1106 and may be transferred to the push service client 1104. In operation 1112, the push service server 1106 may match a push token to at least one of SSP terminal information, application information of the LBA, and an SSP identifier, and may manage the push token. If the event-managing server 1107 registers a push service in the push service server 1106 or transfers a push message thereto in the future, information (a push token, LBA application information, or an SSP identifier) managed by the push service server 1106 in operation 1112 may be used when the push service server 1106 verifies the validity of information in the transferred push message or selects the push service client 1104 to which the push service server 1106 is to send the push message.

In operations 1113 and 1114, the SSP terminal 1101 provides relevant information so as to allow the event-managing server 1107 to register a push service. The relevant information may include at least one among: information about the SSP terminal 1101, information about the LBA 1103, an SSP identifier, and a push token.

The information transferred by the SSP terminal 1101 may include sensitive SSP information such as a first SSP identifier, and thus the SPBL of the SSP and the event-managing server may be required to perform digital certificate-based mutual authentication therebetween in operation 1113. Operation 1113 may include a process in which the SPBL 1102 receives sensitive information (including a digital certificate) about the event-managing server 1107 to verify the server and generates second SSP information that is to be transferred to the server. The digital certificate-based procedure of mutual authentication between the SPBL 1102 and the event-managing server 1107 may be performed with reference to operations 521, 522, 523, 524, 525, and 526 in FIG. 5.

After the SPBL 1102 authenticates the event-managing server and generates the second SSP information in operation 1113, in operation 1114, the LBA 1103 may make a request to the event-managing server 1107 for push service registration. A push service registration request message, which the LBA sends to the event-managing server, may include the following items.

i. Information about a push service registered by the SSP terminal (e.g., GCM, FCM, APNS, WNS, or names of other private push services, or an address or name of a push server).
 ii. Application information (e.g., a hash value of an application, a package name).
 iii. Push token.
 iv. First SSP identifier.
 v. Second SSP identifier.
 vi. Second SSP information. The second SSP information may include an encrypted SPBL certificate and a temporary key capable of forming a session key.

In operation 1115, the event-managing server 1107 verifies the push service registration request message from the SSP terminal 1101. The verification of the push service registration request message may be an operation of decrypting the encrypted SPBL certificate in the second SSP information transmitted in operation 1114 to verify the SPBL certificate. If the SPBL certificate includes a first SSP identifier or a second SSP identifier, the event-managing server 1107 may verify whether the first SSP identifier or the second SSP identifier, included in the certificate, is the same as the first SSP identifier or the second SSP identifier, included in the push service registration request message. When the verification of the SSP terminal 1101 is completed, the event-managing server 1107 may match at least one of the first SSP identifier and the second SSP identifier to the push token in the push service registration request message and may manage the same.

Operation 1116, the event-managing server 1107 may request push server registration from the push service server 1106 on the basis of push service information included in the push service registration request message transferred in operation 1114. If the push service does not require a separate push service registration process at a server side, operations 1116 and 1117 may be omitted. A push server registration request message may include the following items.

i. Push token.
 ii. Application information.

After the push service registration request is received, the push service server 1106 verifies a push token and application information included in the push server registration request message that has been transferred by the event-managing server 1107. The verification process may be a process of verifying whether a push token and application information have been registered in the push service server 1106 through the push service registration procedure between the push service client 1104 and the push service server 1106, as in operation 1112. When the push server registration is completed normally, a completion response is transferred to the event-managing server 1107 in operation 1117.

When the push server registration is completed, the event-managing server 1107 sends a push service registration request response to the LBA 1103 in operation 1118.

FIG. 12 illustrates a process in which an eUICC terminal and an SM-DS register a push service according to embodiments of the present disclosure.

In relation to an embodiment of overall operations in FIG. 12, reference may be made to the embodiment of operations 1010 to 1018 in FIG. 10. However, FIG. 10 relates to an embodiment of an SSP terminal, while FIG. 12 relates to an embodiment of an eUICC terminal. In view thereof, the embodiment may be specified as follows.

Referring to FIG. 12, an eUICC terminal 1201 includes push service client software 1204 capable of supporting a push service. In relation to the push service client 1204, reference may be made to push service client 1004 in FIG. 10.

As in operation 1210, an LPA 1203 is registered in the push service client 1204 in order to be provided with a push service. A method for registering the LPA 1203 in the push service client 1204 may be a method of receiving a push token by using an API provided by the push service client 1204. The push token may be used to uniquely identify a particular application (e.g., the LPA in the present embodiment) among multiple applications registered in the push service client 1204. The LPA 1203 registers for a push service in conjunction with the push service client 1204 in the eUICC terminal 1201. In this process, the LPA 1203 may be registered as an instance in the push service client 1204, and may be issued with a push token. In this process, the push service client 1204 may also transfer application information of the LPA 1203 (e.g., a hash value of an application or an application identifier) to a push service server 1206 to cause the LPA 1203 to register for the push service.

In order to register a push service with multiple SM-DSs 1207, the LPA 1203 may generate multiple push tokens with the push service client 1204, and may classify the push tokens according to the SM-DSs to register the push service in each of the SM-DSs. Further, the LPA 1203 may register a push service in multiple SM-DSs 1207 by using an identical push token. In order to register a push service in multiple SM-DSs 1207 by using an identical push token, the LPA 1203 may transfer side information for identifying the SM-DS 1207 to the SM-DS 1207 in push service registration operation 1211. The side information may be an eUICC identifier generated by combining an EID, which is an identifier of an eUICC 1202, with information about the SM-DS 1207 (e.g., a URL of the SM-DS, an IP address of the SM-DS, or a FQDN of the SM-DS). The eUICC identifier generated by a combination of the EID and the information about the SM-DS 1207 may be called an obfuscated EID (OEID). The OEID may be considered to be a concept similar to a second SSP identifier of an SSP terminal.

When being issued with a push token, the eUICC terminal 1201 transfers the push token to the SM-DS 1207 which is to use a push service using the push token in operation 1211. When the eUICC terminal 1201 transfers the push token, the following types of information may be provided such that the SM-DS 1207 can register the push service at the server side.

i. Information about a push service registered by the eUICC terminal (e.g., GCM, FCM, APNS, WNS, or names of other private push services, or an address or name of a push server).
   ii. Application information (e.g., a hash value of an application, a package name).
   iii. Push token.
   iv. First eUICC identifier.
   v. Second eUICC identifier.
   vi. Second eUICC information and signature value generated using the same.

The SM-DS 1207 having received the above-described information manages an eUICC identifier (a first eUICC identifier or a second eUICC identifier) while linking the eUICC identifier with a push token. The SM-DS 1207 may register a push service in conjunction with the push service server. When an event is registered in the SM-DS 1207 after the push service is registered as described above, the SM-DS 1207 determines a first eUICC identifier or a second eUICC identifier of the eUICC terminal that is to receive the event, generates a push message by using the push token linked with the eUICC identifier, and transmits the push message to the push service server 1206.

When an event is registered in the SM-DS 1207 by a service provider or a bundle-managing server (operation 1212), the SM-DS 1207 may determine whether the eUICC terminal, which is to receive the event, has registered a push service in operation 1213. Operation 1213 may be a procedure of determining whether the eUICC terminal, to which the event registered in the SM-DS 1207 is to be transferred, has registered the push service according to operation 1211. At the time of event registration, an identifier of the eUICC terminal, which is to receive the event, is also transmitted, and thus whether the eUICC terminal supports the push service may be determined using the identifier of the eUICC terminal.

When the eUICC terminal, which is to receive the event registered in operation 1212, registers the push service, the SM-DS 1207 generates a push message and transfers the message to the push service server in operation 1214. In the push message generation process, the SM-DS 1207 may generate a push message including a push token corresponding to the eUICC terminal to which the event is to be sent. The push token may be used when the push service server 1206 identifies the push service client 1204 to which the push message is to be sent. In the push message generation process, a push message further including an eUICC identifier may be generated. The eUICC identifier may be used when the eUICC terminal determine which SM-DS 1207 has sent the push message. Particularly, when a second eUICC identifier is generated using information about the SM-DS 1207 and when the second eUICC identifier is included in the push message, the LPA 1203 may also identify the SM-DS 1207, which has sent the push message, through the second eUICC identifier included in the push message. Further, when the push message includes an address (e.g., FQDN, IP address, etc.) of the SM-DS or an object identifier (OID) of the SM-DS, the LPA 1203 may identify the SM-DS 1207, which has sent the push message, through the address (e.g., FQDN, IP address, etc.) of the SM-DS or the object identifier (OID) of the SM-DS, included in the push message.

The push service server 1206 transfers the generated push message to the push service client 1204 that is to receive the push message according to a push token included in the push message in operation 1215.

The push service client 1204 transfers the push message to software in the terminal, linked with the push token included in the push message in operation 1216. In the present embodiment, the software in the terminal is the LPA 1203.

The LPA 1203 having received the push message searches for an SM-DS address matched to the push token included in the push message in operation 1217, and makes an event package transfer request after a procedure of mutual authentication with the SM-DS 1207 corresponding to the address in operation 1218. If the push message includes an eUICC identifier, the SM-DS address may also be discovered by using the eUICC identifier.

The event package transfer procedure in operation 1218 may be a process in which the eUICC terminal attempts an HTTPS connection to the SM-DS by using the SM-DS address determined in operation 1217 on the basis of the GSMA SGP.22 standard, and receives an event through ES11 functions (ES11.InitiateAuthenticate, ES11.AuthenticateClient) defined in the GSMA SGP.22 standard.

Figure 13:
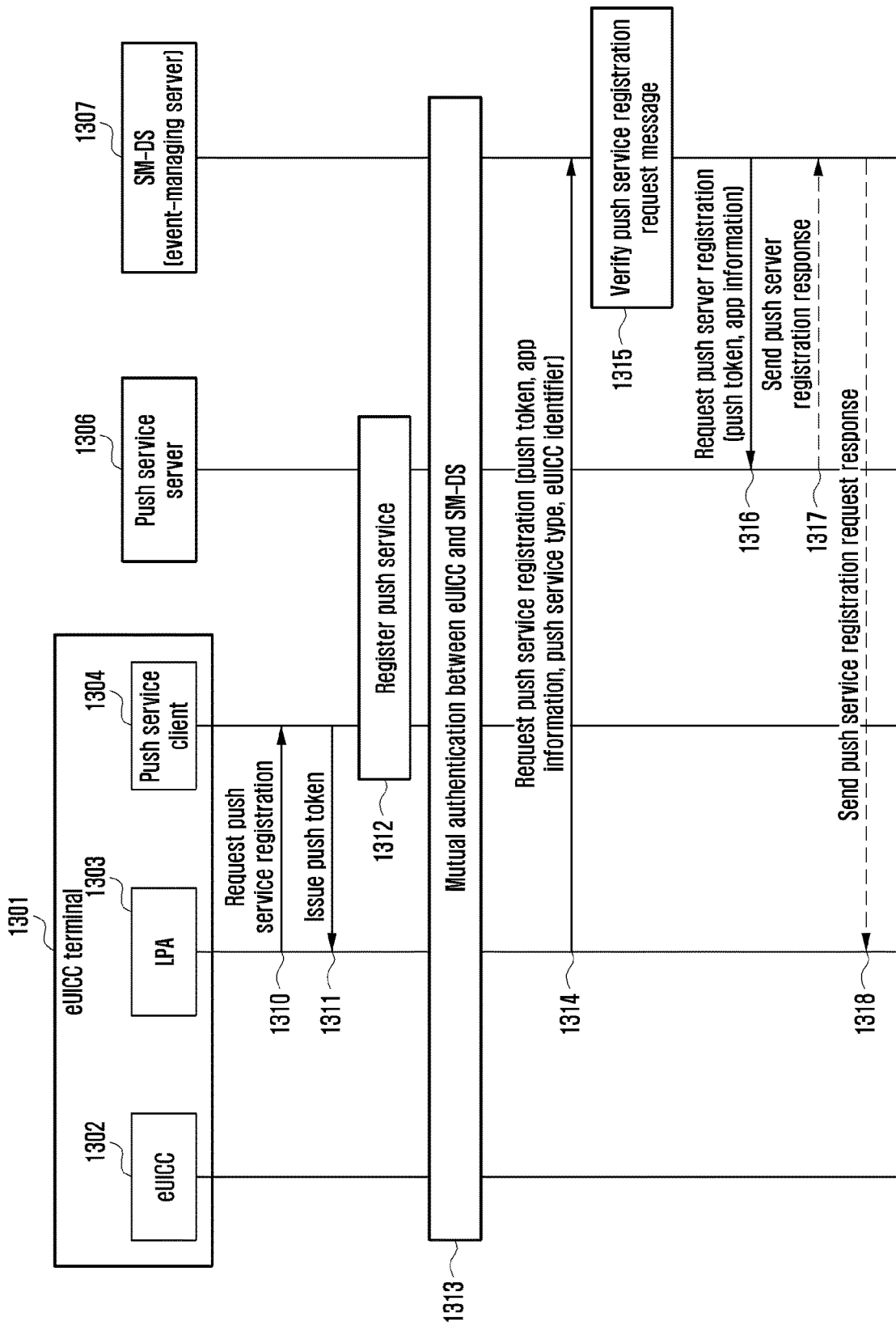
FIG. 13 illustrates another process in which an eUICC terminal and an SM-DS register a push service according to embodiments of the present disclosure.

FIG. 13 illustrates another process in which an eUICC terminal and an SM-DS register a push service according to embodiments of the present disclosure.

An address of an SM-DS 1307, to which a push service is desired to be connected, and whether the push service is supported may be stored in an LPA 1303 of an eUICC terminal 1301, or may be stored in an eUICC 1302. Although not illustrated, through information about the SM-DS 1307, stored in the LPA 1303 or the eUICC 1302, the eUICC terminal 1301 may determine whether the connection of the push service to the SM-DS 1307 is possible. The information about the SM-DS 1307 may be provided to the LPA 1303 through a user's input or information transferred from the outside.

In operation 1310, the LPA 1303 of the eUICC terminal 1301 requests a push service client 1304 to register a push service. When requesting the push service registration, the LPA 1303 may transfer application information thereof to the push service client 1304. The application information of the LPA, which the LPA 1303 transfers to the push service client 1304, may include a hash value of an LPA application, a package name thereof, etc. When requesting the push service registration, the LPA 1303 may additionally transfer an eUICC identifier to the push service client 1304. Although is not illustrated, the LPA 1303 may read a first eUICC identifier from the eUICC 1302, and may combine the first eUICC identifier with an address of the SM-DS 1307 to generate a second eUICC identifier. The SM-DS address may be a full qualified domain name (FQDN), a full uniform resource locator (full URL), or an IP address of the SM-DS 1307.

In operation 1311, the push service client 1304 issues a push token to the LPA 1303. The push service client 1304 matches the issued push token to the application information of the LPA. Before a push token is issued in operation 1311, the push service client 1304 may also transfer the application information of the LPA and the push token to a push service server 1306 to register a push service. According to some embodiments, a push token may be also generated by the push service server 1306. In this case, the push service client 1304 may generate a push service with the push service server 1306, and the push service server 1306 may generate a push token after the generation of the push service and may then transfer the push token to the push service client 1304. The push service client 1304 transfers the push token to the LPA 1303. If a push token is generated by the push service server 1306, operation 1312 may be omitted.

In operation 1312, the push service client 1304 registers the push service in the push service server 1306 by using the same push token as transferred to the LPA 1303. A detailed process of operation 1312 may be differently performed depending on the type of the push service client 1304 and the push service server 1306. In operation 1312, the push service client 1304 may transfer at least one of the application information of the LPA and the eUICC identifier to the push service server 1306. For security, it is recommended that a second eUICC identifier is used as the eUICC identifier.

According to some embodiments, the sequence of operations 1311 and 1312 may be changed. In this case, a push token may be generated by the push service client 1304 and may be transferred to the push service server 1306, or may be generated by the push service server 1306 and may be transferred to the push service client 1304. In operation 1312, the push service server 1306 may match a push token to at least one of eUICC terminal information, application information of the LPA, and an eUICC identifier, and may manage the same. If the SM-DS 1307 performs push server registration in the push service server 1306 or transfers a push message thereto in the future, information (a push token, eUICC termination information, LPA application information, or an eUICC identifier) managed by the push service server 1306 in operation 1312 may be used when the push service server 1306 verifies the validity of information in the transferred push message or selects the push service client 1304 to which the push service server 1306 is to send the push message.

In operations 1313 and 1314, the eUICC terminal 1301 provides relevant information so as to allow the SM-DS 1307 to register a push service. The relevant information may include at least one among information about the eUICC terminal 1301, information about the LPA 1303, an eUICC identifier, and a push token.

The information transferred by the eUICC terminal 1301 may include sensitive eUICC information such as a first eUICC identifier, and thus the eUICC 1302 and the SM-DS 1307 may be required to perform digital certificate-based mutual authentication therebetween in operation 1313. Operation 1313 may be an operation in which the eUICC terminal 1301 performs a common mutual authentication procedure with the SM-DS 1307 according to the GSMA SGP.22 standard.

In operation 1314, the LPA 1303 may request the SM-DS 1307 to register a push service. A push service registration request message, which the LPA 1303 sends to the SM-DS 1307, may include the following items.

i. Information about a push service registered by the eUICC terminal (e.g., GCM, FCM, APNS, WNS, or names of other private push services, or an address or name of a push server).
  ii. Application information (e.g., a hash value of an application, a package name).
  iii. Push token.
  iv. First eUICC identifier.
  v. Second eUICC identifier.
  vi. Second eUICC information and signature value generated using the same.

In operation 1315, the SM-DS 1307 verifies the push service registration request message received from the eUICC terminal 1301. The verification of the eUICC terminal 1301 may be an operation of decrypting an encrypted eUICC certificate in the second eUICC information transmitted in operation 1314 to verify the eUICC certificate. If the eUICC certificate includes a first eUICC identifier or a second eUICC identifier, the SM-DS 1307 may verify whether the first eUICC identifier or the second eUICC identifier, included in the certificate, is the same as the first eUICC identifier or the second eUICC identifier, included in the push service registration request message. When the verification of the eUICC terminal 1301 is completed, the SM-DS 1307 may match at least one of the first eUICC identifier and the second eUICC identifier to the push token in the push service registration request message and may manage the same.

Operation 1316, the SM-DS 1307 may request push server registration from the push service server 1306 on the basis of push service information included in the push service registration request message transferred in operation 1314. If the push service does not require a separate push service registration process at a server side, operations 1316 and 1317 may be omitted. A push server registration request message may include the following items.

i. Push token.
ii. Application information.

After the push service registration request is received, the push service server 1306 verifies a push token and application information included in the push server registration request message that has been transferred by the SM-DS 1307. The verification process may be a process of verifying whether a push token and application information have been registered in the push service server 1306 through the push service registration procedure between the push service client 1304 and the push service server 1306, as in operation 1312. When the push server registration is completed normally, a completion response is transferred to the SM-DS 1307 in operation 1317.

When the push server registration is completed, the SM-DS 1307 sends a push service registration request response to the LPA 1303 in operation 1318.

Figure 14:
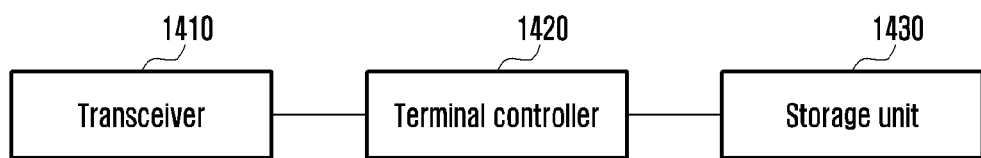
FIG. 14 illustrates a terminal device according to embodiments of the present disclosure.

FIG. 14 illustrates a structure of a terminal according to embodiments of the present disclosure.

Referring to FIG. 14, the terminal may include a transceiver 1410, a terminal controller 1420, and a storage unit 1430. In the disclosure, the terminal controller 1420 may be defined as a circuit, an application-specific integrated circuit, or at least one processor.

The transceiver 1410 may transmit or receive signals to or from another network entity such as a server. For example, the transceiver may receive system information from the server, and may transmit or receive messages and/or information according to the present embodiment.

The terminal controller 1420 may control overall operations of the terminal according to an embodiment presented in the disclosure. For example, the terminal controller 1420 may control a signal flow between blocks so as to perform the operations according to the above-described drawings and flowcharts.

The storage unit 1430 may store at least one of information transmitted or received through the transceiver and information generated by the terminal controller.

Figure 15:
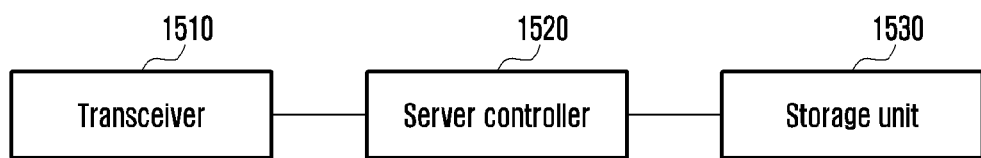
FIG. 15 illustrates a server device according to embodiments of the present disclosure.

FIG. 15 illustrates a structure of a server according to embodiments of the present disclosure. The server illustrated in FIG. 15 may include an external server such as a bundle-managing server, a push service server, or an event-managing server.

Referring to FIG. 15, the server may include a transceiver 1510, a server controller 1520, a storage unit 1330. In the disclosure, the server controller 1520 may be defined as a circuit, an application-specific integrated circuit, or at least one processor.

The transceiver 1510 may transmit or receive signals to or from another network entity. For example, the transceiver 1510 may transmit system information to a terminal, and may transmit or receive messages and/or information according to the present embodiment.

The server controller 1520 may control overall operations of the server according to an embodiment presented in the disclosure. For example, the server controller 1520 may control operations presented in the disclosure.

The storage unit 1530 may store at least one of information transmitted or received through the transceiver and information generated by the server controller.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY STORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

Further, it will be apparent that some or all of specific embodiments of the above-described various embodiments may be performed in combination with some or all of the other embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
transmitting, to a smart secure platform discovery service (SSPDS), by a local bundle assistant (LBA) of the terminal, a request for a push based event notification;
receiving, from the SSPDS, an indication indicating whether the SSPDS accepts the request; and
in case that the indication indicates that the SSPDS accepts the request, receiving, from the SSPDS, a notification of an SSPDS event registration based on an SSPDS event being registered for a smart secure platform (SSP) of the terminal being registered.

2. The method of claim 1, further comprising:
receiving, from the SSPDS, the SSPDS event based on the notification of the SSPDS event registration after the SSP of the terminal is authenticated,
wherein the SSPDS event is registered in the SSPDS by a secondary platform bundle manager.

3. The method of claim 1,
wherein the LBA is configured with an SSPDS address,
wherein the SSPDS address is configured per a family identifier or a custodian identifier, and
wherein a primary platform identifier (PPID) is displayed with the SSPDS address configured in the LBA.

4. The method of claim 1, further comprising:
transmitting, to the SSPDS, by the LBA, a first message for checking the SSPDS event registered for the SSP of the terminal;
receiving, from the SSPDS, a second message including information on whether the SSPDS event is registered for the SSP of the terminal; and
receiving, from the SSPDS, the SSPDS event based on the second message after the SSP of the terminal is authenticated.

5. The method of claim 4,
wherein the first message includes an identifier associated with the SSP of the terminal,
wherein the identifier is generated based on a primary platform identifier (PPID) of the terminal and a server address,
wherein the identifier is used for discovering the SSPDS event registered in the SSPDS, and
wherein a transmission of the first message and a reception of the second message are performed by the LBA without mutual authentication between the terminal and the SSPDS.

6. A method performed by a smart secure platform discovery service (SSPDS) in a wireless communication system, the method comprising:
receiving, a local bundle assistant (LBA) of a terminal, a request for a push based event notification;
determining whether to accept the request for the push based event notification;
transmitting, to the LBA of the terminal, an indication indicating whether the SSPDS accepts the request;
registering an SSPDS event for a smart secure platform (SSP) of the terminal; and
in case that the SSPDS accepts the request, transmitting, to the LBA of the terminal, a notification of the SSPDS event registration.

7. The method of claim 6, further comprising:
transmitting, to the LBA of the terminal, the SSPDS event based on the notification of the SSPDS event registration after the SSP of the terminal is authenticated,
wherein the SSPDS event is registered in the SSPDS by a secondary platform bundle manager.

8. The method of claim 6,
wherein the LBA is configured with an SSPDS address, wherein the SSPDS address is configured per a family identifier or a custodian identifier, and wherein a primary platform identifier (PPID) is displayed with the SSPDS address configured in the LBA.

9. The method of claim 6, further comprising:

registering at least one SSPDS event for the SSP of the terminal;

receiving, from the LBA of the terminal, a first message for checking the SSPDS event registered for the SSP of the terminal;

transmitting, to the LBA of the terminal, a second message including information on whether the SSPDS event is registered for the SSP of the terminal; and transmitting, to the LBA of the terminal, the at least one SSPDS event based on the second message after authenticating the SSP of the terminal.

10. The method of claim 9, wherein the first message includes an identifier associated with the SSP of the terminal, wherein the identifier is generated based on a primary platform identifier (PPID) of the terminal and a server address, wherein the identifier is used for discovering the SSPDS event registered in the SSPDS, and wherein a transmission of the first message and a reception of the second message are performed by the LBA without mutual authentication between the terminal and the SSPDS.

11. A terminal in a wireless communication system, the terminal comprising:

a transceiver; and a controller configured to:

transmit, to a smart secure platform discovery service (SSPDS), by a local bundle assistant (LBA) of the terminal, a request for a push based event notification, receive, from the SSPDS, an indication indicating whether the SSPDS accepts the request, and in case that the indication indicates that the SSPDS accepts the request, receive, from the SSPDS, a notification of an SSPDS event registration based on an SSPDS event being registered for a smart secure platform (SSP) of the terminal being registered.

12. The terminal of claim 11, wherein the controller is configured to receive, from the SSPDS, the SSPDS event based on the notification of the SSPDS event registration after the SSP of the terminal is authenticated, and wherein the SSPDS event is registered in the SSPDS by a secondary platform bundle manager.

13. The terminal of claim 11, wherein the LBA is configured with an SSPDS address, wherein the SSPDS address is configured per a family identifier or a custodian identifier, and wherein a primary platform identifier (PPID) is displayed with the SSPDS address configured in the LBA.

14. The terminal of claim 11, wherein the controller is configured to:

transmit, to the SSPDS, by the LBA, a first message for checking the SSPDS event registered for the SSP of the terminal;

receive, from the SSPDS, a second message including information on whether the SSPDS event is registered for the SSP of the terminal; and receive, from the SSPDS, the SSPDS event based on the second message after the SSP of the terminal is authenticated.

15. The terminal of claim 14, wherein the first message includes an identifier associated with the SSP of the terminal, wherein the identifier is generated based on a primary platform identifier (PPID) of the terminal and a server address, wherein the identifier is used for discovering the SSPDS event registered in the SSPDS, and wherein a transmission of the first message and a reception of the second message are performed by the LBA without mutual authentication between the terminal and the SSPDS.

16. A smart secure platform discovery service (SSPDS) in a wireless communication system, the SSPDS comprising:

a transceiver; and a controller configured to:

receive, a local bundle assistant (LBA) of a terminal, a request for a push based event notification, determine whether to accept the request for the push based event notification, transmit, to the LBA of the terminal, an indication indicating whether the SSPDS accepts the request, register an SSPDS event for a smart secure platform (SSP) of the terminal, and in case that the SSPDS accepts the request, transmit, to the LBA of the terminal, a notification of the SSPDS event registration.

17. The SSPDS of claim 16, wherein the controller is configured to transmit, to the LBA of the terminal, the SSPDS event based on the notification of the SSPDS event registration after the SSP of the terminal is authenticated, and wherein the SSPDS event is registered in the SSPDS by a secondary platform bundle manager.

18. The SSPDS of claim 16, wherein the LBA is configured with an SSPDS address, wherein the SSPDS address is configured per a family identifier or a custodian identifier, and wherein a primary platform identifier (PPID) is displayed with the SSPDS address configured in the LBA.

19. The SSPDS of claim 16, wherein the controller is configured to:

register at least one SSPDS event for the SSP of the terminal, receive, from the LBA of the terminal, a first message for checking the SSPDS event registered for the SSP of the terminal, transmit, to the LBA of the terminal, a second message including information on whether the SSPDS event is registered for the SSP of the terminal, and transmit, to the LBA of the terminal, the at least one SSPDS event based on the second message after authenticating the SSP of the terminal.

20. The SSPDS of claim 19, wherein the first message includes an identifier associated with the SSP of the terminal, wherein the identifier is generated based on a primary platform identifier (PPID) of the terminal and a server address, wherein the identifier is used for discovering the SSPDS event registered in the SSPDS, and wherein a transmission of the first message and a reception of the second message are performed by the LBA without mutual authentication between the terminal and the SSPDS.

* * * * *